US009367780B2

(12) United States Patent
Urasawa

(10) Patent No.: US 9,367,780 B2
(45) Date of Patent: Jun. 14, 2016

(54) IMAGE FORMING SYSTEM AND INFORMATION PROCESSOR THAT PERFORM PRINTING BASED ON DELEGATION TO USERS WHO DID NOT EXECUTE PRINTING

(71) Applicant: Oki Data Corporation, Tokyo (JP)

(72) Inventor: Koji Urasawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/460,600

(22) Filed: Aug. 15, 2014

(65) Prior Publication Data

US 2015/0049357 A1 Feb. 19, 2015

(30) Foreign Application Priority Data

Aug. 16, 2013 (JP) ................................ 2013-169132

(51) Int. Cl.
| G06K 15/00 | (2006.01) |
| G06F 21/31 | (2013.01) |
| G06F 21/34 | (2013.01) |
| G06F 21/60 | (2013.01) |

(52) U.S. Cl.
CPC ............ *G06K 15/4095* (2013.01); *G06F 21/31* (2013.01); *G06F 21/34* (2013.01); *G06F 21/608* (2013.01)

(58) Field of Classification Search
CPC ... G06K 15/4095; G06F 21/34; G06F 21/608; G06F 21/31
USPC .......................................... 358/1.13–1.15, 1.9
See application file for complete search history.

(56) References Cited

U.S. PATENT DOCUMENTS

| 8,423,781 | B2* | 4/2013 | Eun et al. ........................ 713/182 |
| 2003/0090705 | A1* | 5/2003 | Ferlitsch ........................ 358/1.15 |
| 2007/0008581 | A1* | 1/2007 | Han .................................. 358/1.15 |
| 2009/0073483 | A1* | 3/2009 | Oomori ........................... 358/1.14 |
| 2009/0236410 | A1* | 9/2009 | Noda et al. ...................... 235/375 |

(Continued)

FOREIGN PATENT DOCUMENTS

| JP | 2005-335282 A | 12/2005 |
| JP | 2009-066926 A | 4/2009 |

(Continued)

*Primary Examiner* — Benny Q Tieu
*Assistant Examiner* — Quyen V Ngo
(74) *Attorney, Agent, or Firm* — Muncy, Geissler, Olds & Lowe, P.C.

(57) ABSTRACT

An image forming system with an information processor and an image forming device includes a memory that pre-stores user identification information, an input that accepts an entry of delegation identification information, a data creation part that creates transmission data using the delegation destination identification information as first authentication information when the entry of the delegation destination identification information is accepted, and that creates transmission data using user identification information as first authentication information when the entry of the delegation destination identification information is not accepted, a transmission part that sends the transmission data to the image forming device including a reception part that receives the transmission data, an authentication part that performs authentication using the first authentication information, that permits image formation based upon the transmission data when the authentication is successful, and an image forming part that forms an image on a recording medium based upon the transmission data.

19 Claims, 30 Drawing Sheets

(56) References Cited

U.S. PATENT DOCUMENTS

| | | | |
|---|---|---|---|
| 2009/0262381 A1* | 10/2009 | Tsujimoto | 358/1.14 |
| 2010/0208287 A1* | 8/2010 | Hanaoka et al. | 358/1.15 |
| 2010/0302575 A1* | 12/2010 | Hanaoka et al. | 358/1.15 |
| 2011/0317215 A1* | 12/2011 | Ida et al. | 358/1.15 |
| 2012/0250067 A1* | 10/2012 | Liu et al. | 358/1.14 |
| 2014/0320883 A1* | 10/2014 | Ichida | 358/1.14 |

FOREIGN PATENT DOCUMENTS

| | | |
|---|---|---|
| JP | 2009-070119 A | 4/2009 |
| JP | 2012-224000 A | 11/2012 |

* cited by examiner

| ID | Identification Info. | Creator | Creation Time |
|---|---|---|---|
| 1 | Jiro Sato | Yuji Hirai | 9:12:00 |
| 2 | Taro Yamada | Yuji Hirai | 10:36:42 |
| 3 | Taro Yamada | Yuji Hirai | 11:55:55 |
| 4 | Jiro Sato | Jiro Sato | 12:15:30 |
| 5 | Taro Yamada | Jiro Sato | 12:30:01 |

| ID | User | Size | Sheet No. | Color |
|---|---|---|---|---|
| 2 | Taro Yamada | A4 | 5 | Mono |
| 3 | Taro Yamada | A3 | 11 | Colored |
| 5 | Taro Yamada | A4 | 3 | Mono |

| Charge Report | | | |
|---|---|---|---|
| User | Size | Sheet No. | Color |
| Taro Yamada | A4 | 5 | Mono |
| Taro Yamada | A3 | 11 | Colored |
| Taro Yamada | A4 | 3 | Mono |

| ID | User | Size | Sheet No. | Color |
|----|------|------|-----------|-------|
| 2 | Yuji Hirai | A4 | 5 | Mono |
| 3 | Yuji Hirai | A3 | 11 | Colored |
| 5 | Jiro Sato | A4 | 3 | Mono |

| Charge Report | | | |
|---|---|---|---|
| User | Size | Sheet No. | Color |
| Yuji Hirai | A4 | 5 | Mono |
| Yuji Hirai | A3 | 11 | Colored |
| Jiro Sato | A4 | 3 | Mono |

Correspondence Table Creation Tool — 108

| No. | Login Name | IC Card Identification Info. | PIN |
|-----|------------|------------------------------|--------|
| 1 | Jiro Sato | xxxxxxxx | 123456 |
| 2 | Taro Yamada | yyyyyyyy | 234567 |
| 3 | Ken Arai | zzzzzzzz | 345678 |
| 4 | Yuji Hirai | bbbbbbbb | 456789 |
| 5 | Junko Saito | cccccccc | 567890 |

1081 — Login Name
1082 — IC Card Identification Info.
1083 — PIN
1084 — ADD / DELETE / READ / SAVE / SEND

Fig. 27  ⸺CTD

| |
|---|
| Job Start Command |
| Job Type: Correspondence Table Download Data |
| Record 1:<br>LOGIN_NAME="Jiro Sato"<br>CARD_ID="xxxxxxxxxx"<br>PIN="123456" |
| Record 2:<br>LOGIN_NAME="Taro Yamada"<br>CARD_ID="yyyyyyyyyy"<br>PIN="234567" |
| Record 3:<br>LOGIN_NAME="Ken Arai"<br>CARD_ID="zzzzzzzzzz"<br>PIN="345678" |
| Record 4:<br>LOGIN_NAME="Yuji Hirai"<br>CARD_ID="bbbbbbbbbb"<br>PIN="456789" |
| Record 5:<br>LOGIN_NAME="Junko Saito"<br>CARD_ID="cccccccccc"<br>PIN="567890" |
| Job End Command |

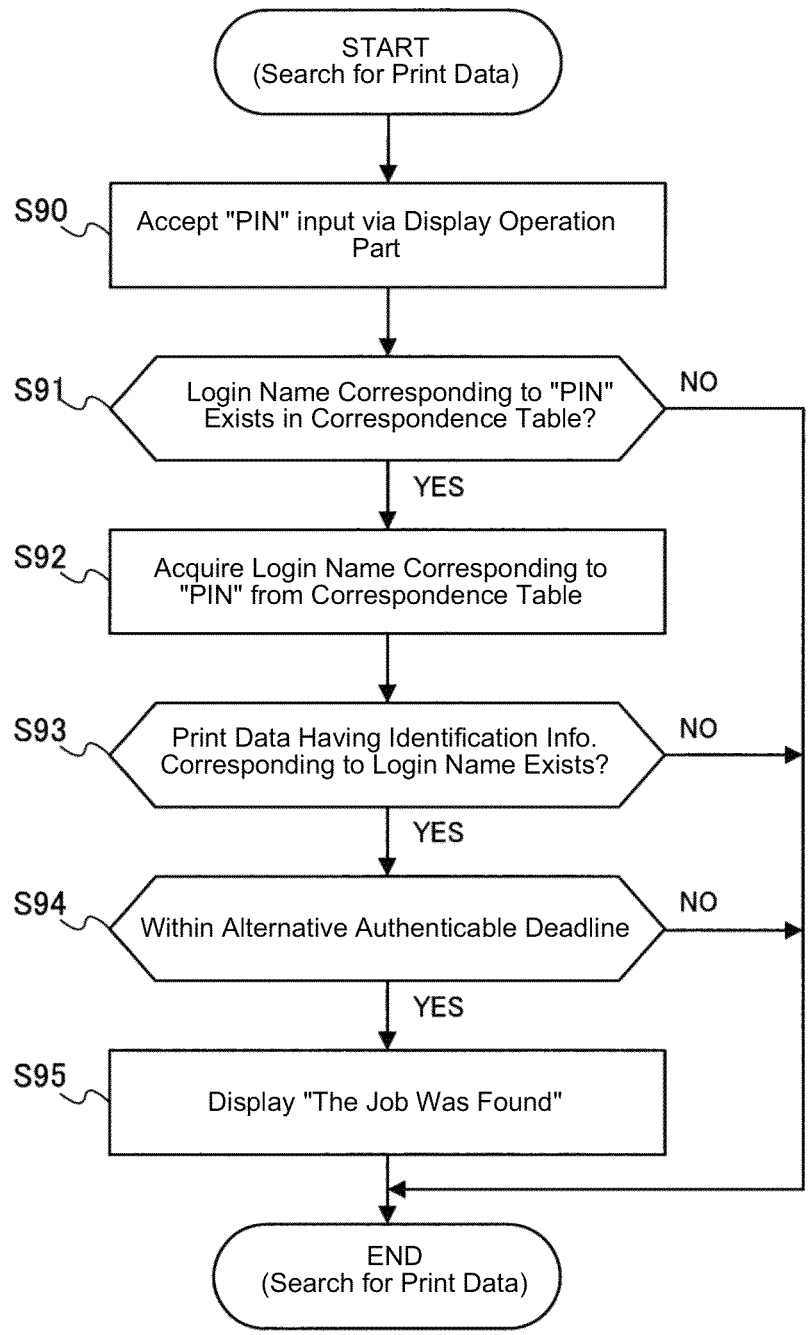

IMAGE FORMING SYSTEM AND INFORMATION PROCESSOR THAT PERFORM PRINTING BASED ON DELEGATION TO USERS WHO DID NOT EXECUTE PRINTING

CROSS REFERENCE TO RELATED APPLICATION

The present application is related to, claims priority from and incorporates by reference Japanese Patent Application No. 2013-169132, filed on Aug. 16, 2013.

TECHNICAL FIELD

The present invention relates to an image forming system and an information processor.

BACKGROUND

There is an image forming system that makes a comparison between user identification information added to print data received by an image forming device and user identification information read from an IC card using an IC card reader connected to the image forming device, and that prints the print data when both match. Conventionally, as this type of image forming system, there is one disclosed in Patent Literature (Japanese Laid-Open Patent Application 2005-335282). The image forming system described in Patent Literature 1 is based upon the premise that the user who sends the print data and the user who acquires the print output are the same person.

However, in the image forming system described in Patent Literature 1, there is the problem that a means to delegate the print output to another user by a user who sends the print data is not provided. For example, a means to delegate a printout of print data sent by a company president to his/her secretary is not provided. Consequently, in the system described in the Patent Literature above, when the secretary acquires the print output, the president needs to lend his/her IC card to the secretary.

The present invention targets at enabling the delegation of the right to output the result of an image formation to another person when the result of the image formation is output as a result of authentication.

An image forming system disclosed in the application, in which an information processor and an image forming device are transmissibly connected. The information processor includes a memory that pre-stores user identification information, an input that accepts an entry of delegation identification information indicating a delegation destination of an image formation output, a data creation part that creates transmission data using the delegation destination identification information as first authentication information when the entry of the delegation destination identification information is accepted by the input part, and that creates transmission data using user identification information stored in the memory as first authentication information when the entry of the delegation destination identification information is not accepted by the input part, and a transmission part that sends the transmission data created by the data creation part to the image forming device; and the image forming device includes a reception part that receives the transmission data, an authentication part that performs authentication using the first authentication information included in the transmission data received by the reception part, and that permits image formation based upon the transmission data received by the reception part when the authentication is successful, and an image forming part that forms an image on a recording medium based upon the transmission data permitted by the authentication part.

According to one mode of the present invention, when the results of image formation is output as the result of authentication, the right to output the results of the image formation can be delegated to another person.

BRIEF DESCRIPTION OF DRAWINGS

FIG. 17 is a schematic view showing one example of charge data in Embodiment 1.

FIG. 19 is a schematic view showing one example of charge report print results in Embodiment 1.

FIG. 21 is a schematic view showing one example of charge data in Embodiment 2.

FIG. 22 is a schematic view showing one example of a charge report print result in Embodiment 2.

FIG. 26 is a schematic view showing one example of a correspondence table creation screen in Embodiment 3.

FIG. 27 is a schematic view showing one example of correspondence download data in Embodiment 3.

FIG. 34 is a flowchart showing a print data search process upon alternate authentication printing in Embodiment 4.

PREFERRED EMBODIMENTS OF INVENTION

Figure 1:
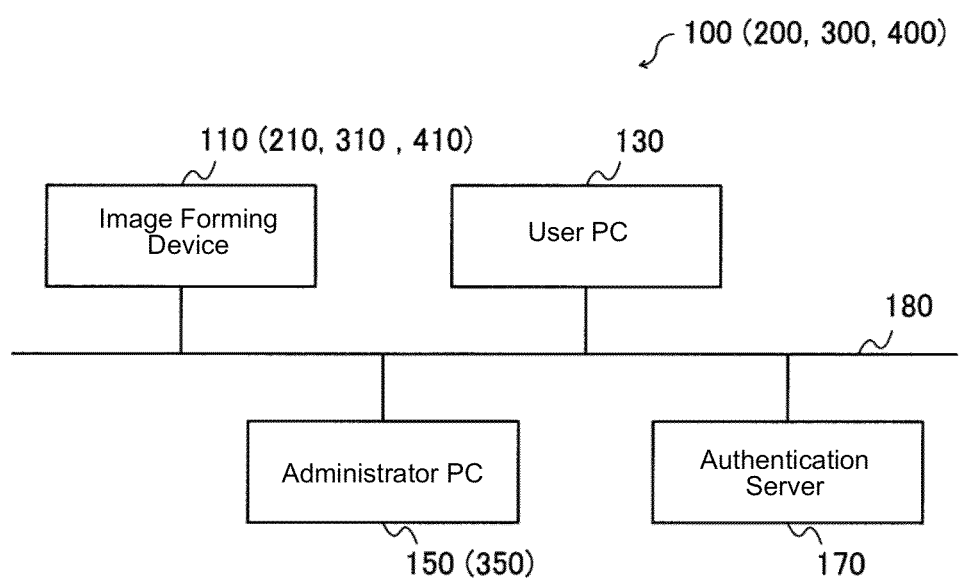
FIG. 1 is a block diagram schematically showing the configuration of an image forming system relating to Embodiments 1 to 4.

Embodiment 1 (Explanation of configuration) FIG. 1 is a block diagram schematically showing the configuration of an image forming system 100 relating to Embodiment 1. Furthermore, symbols within parentheses in FIG. 1 indicate configuration of Embodiments 2 to 4, respectively. The image forming system 100 is equipped with an image forming device 110, a user PC 130, an administrator PC 150 and an authentication server 170.

The image forming device 110 is a device that forms an image on a recording medium, such as paper. The user PC 130 is an information processor (first information processor) that is used for transmitting print data to the image forming device 110. The administrator PC 150 is an information processor (second information processor) that is used for registration of administration information to the image forming device 110 by an administrator. The authentication server 170 is an information processor (third information processor) that implements user authentication using a known technology, such as lightweight directory access protocol (LDAP). The image forming device 110, the used PC 130, the administrator PC 150 and the authentication server 170 are connected to a network 180. The network 180 is a communication line connecting the image forming device 110, the user PC 130, the administrator PC 150 and the authentication server 170.

Figure 2:
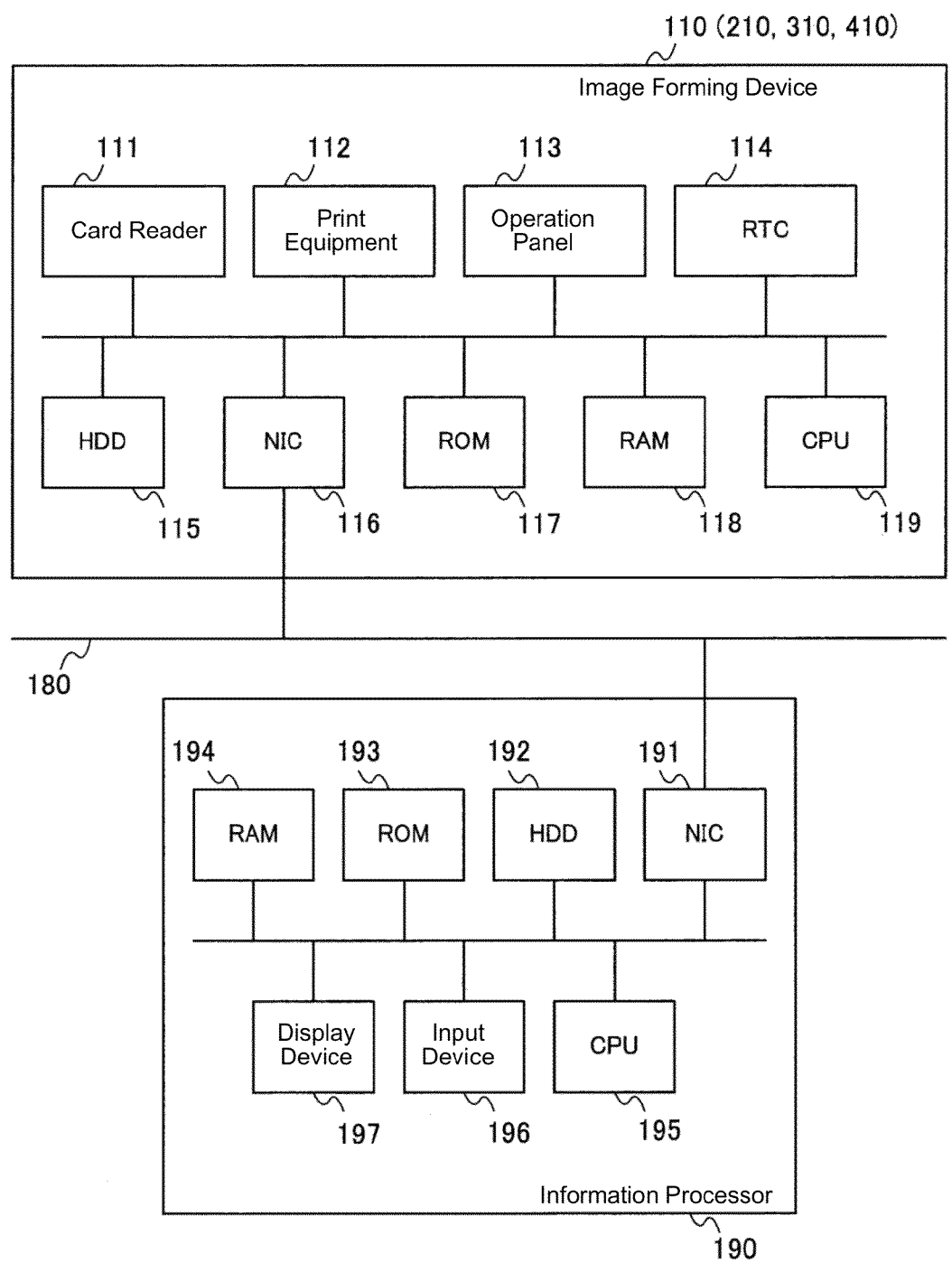
FIG. 2 is a block diagram schematically showing the hardware configuration of an image forming device and an information processor relating to Embodiments 1 to 4.

FIG. 2 is a block diagram schematically showing hardware configuration of the image forming device 110 and an information processor 190. Furthermore, symbols within parentheses in FIG. 2 indicate the configuration of Embodiments 2 to 4, respectively. Furthermore, the information processor 190 functions as the user PC 130, the administrator PC 150 or the authentication server 170. The hardware configuration of the user PC 130, the administrator PC 150 and the authentication server 170 is the same.

The image forming device 110 is equipped with an image forming device 110, a card reader 111, printing equipment 112, an operating panel 113, an RTC 114, a hard disk drive (HDD) 115, a network interface card (NIC) 116, read-only memory (ROM) 117, random access memory (RAM) 118 and a central processing unit (CPU) 119.

The card reader 111 is a device that reads information from an IC card using known technology. The printing equipment 112 is a device that forms an image and outputs the image onto a recording medium, such as paper, using known printing technology. The operating panel 113 is a device composed of a display panel and operation keys. The operating panel 113 functions as a display and an operation part. A real time clock (RTC) 114 is a device that measures time. Time measured by the RTC is the current time. The RTC 114 continues to indicate the current time even if the power source of the image forming device 110 is cut off.

The HDD 115 is a device where various programs and data are permanently stored. The NIC 116 is a communication interface that sends and receives data via the network 180 by known communication technology. The ROM 117 is a memory medium where program(s) and data for operating the image forming device 110 are read only. The RAM 118 is a memory medium where various programs and data are temporarily stored. The CPU 119 is a device that controls the operation of the entire image forming device 110. The HDD 115, the ROM 117 and the RAM 118 function as memory where programs and data are stored. The CPU 119 controls the image forming device 110 by executing the programs stored in the HDD 115, the ROM 117 and the RAM 118, and functions as a controller that processes in the image forming device 110.

An information processor 190 is equipped with an NIC 191, an HDD 192, a ROM 193, a RAM 194, a CPU 195, an input device 196 and a display device 197. The NIC 191 is a communication interface that sends and receives data via the network 180 by known communication technology. The HDD 192 is a device where various programs and data are permanently stored. The ROM 193 is a recording medium where programs for operating the information processor 190 and data are stored as read only. The RAM 194 is a memory medium where various programs and data are temporarily stored. The CPU 195 is a device that controls operation of the entire information processor 190. The input device 196 is a device that accepts operational input. The display device 197 is a device for display. The HDD 192, the ROM 193 and the RAM 194 function as memory where programs and data are stored. The CPU 195 functions as a controller for controlling the information processor 190 and processing at the information processor 190, by executing the programs stored in the HDD 192, the ROM 193 and the RAM 194.

Figure 3:
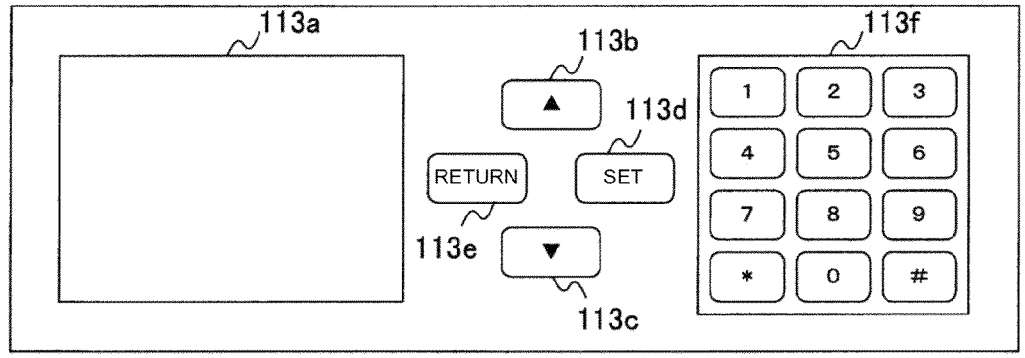
FIG. 3 is an external view schematically showing an operating panel in Embodiment 1.

FIG. 3 is an external view schematically showing the operating panel 113. The operating panel 113 is equipped with a display panel 113a, an UP key 113b, a DOWN key 113c, a SET key 113d, a RETURN key 113e and a numerical keypad 113f. The display panel 113a displays characters and images using known display technology. For example, the display panel 113a can be formed with a liquid crystal display (LCD) panel. The UP key 113b is a hardware key that is used on the occasion of moving the focus upward. The DOWN key 113c is a hardware key that is used on the occasion of moving the focus downward. The SET key 113d is a hardware key that is used for setting the operation. The RETURN key 113e is a hardware key that is used for returning the operation without setting. The numerical keypad 113f is a hardware key that is used for numerical value entry. The display panel 113a functions as a display part, and the UP key 113b, the DOWN key 113c, the SET key 113d, the RETURN key 113e and the numerical keypad 113f and the numerical keypad 113f function as operation parts.

Figure 4:
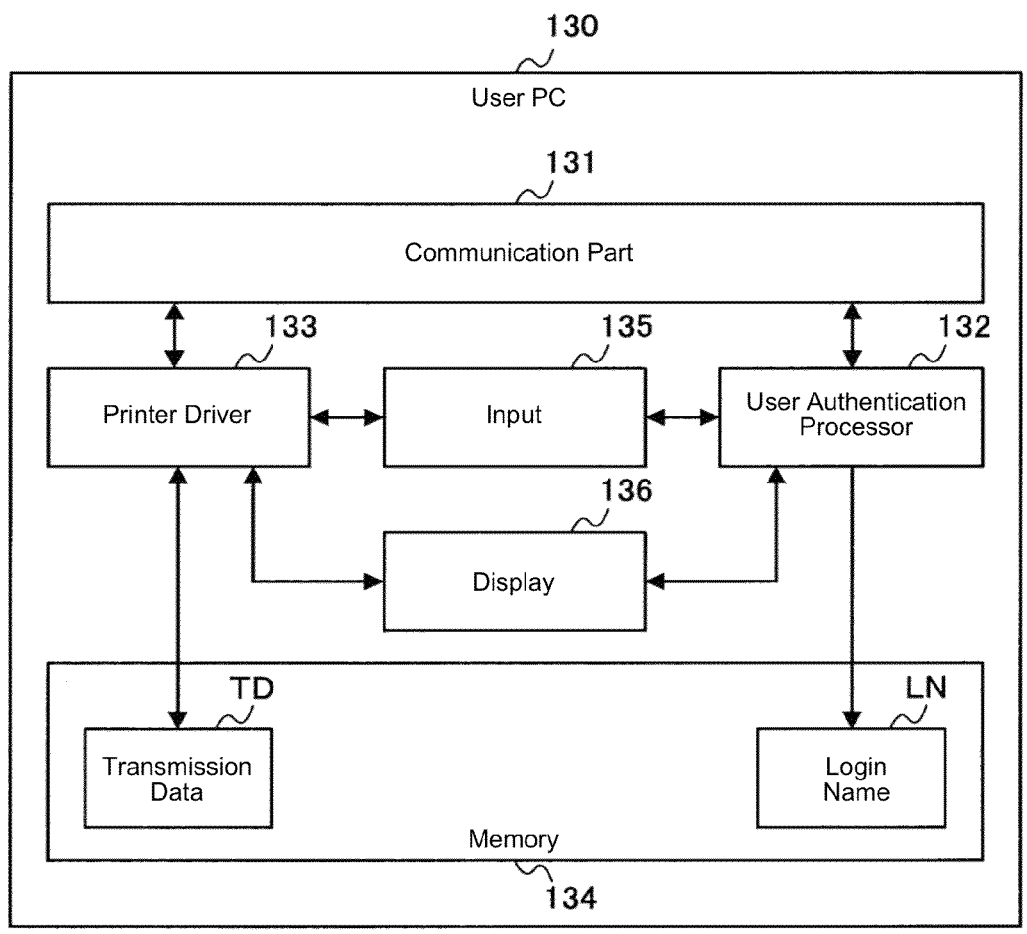
FIG. 4 is a block diagram schematically showing the functional configuration of a user PC in Embodiment 1.

FIG. 4 is a block diagram schematically showing the functional configuration of the user PC 130. The user PC 130 is equipped with a communication part 131, a user authentication processing part, a printer driver 133, a memory 134, an input 135 and a display 136.

The communication part 131 functions as a transmission part and a reception part for sending and receiving data with the network 180. The user authentication processor 132 communicates with the authentication server 170 using a known technology, and implements the user authentication. The printer driver 133 is a data creation part that creates transmission data to be sent to the image forming device 110 for forming an image. The printer driver 133 includes first authentication information that is used on the occasion of authenticating transmission data. For example, the printer driver 133, when an entry of delegation destination identification information is accepted by the input 135, creates transmission data using the delegation destination identification information as the first authentication information. In the meantime, the printer driver 133, when an entry of delegation destination identification information is not accepted by the input 135, creates transmission data using user identification information stored in the memory as the first authentication information. The memory 134 stores data and programs. For example, the memory 134 stores a login name LN as the user identification information and transmission data TD. The login name LN is an account name of a user that is authenticated by the user authentication processor 132.

Figure 5:
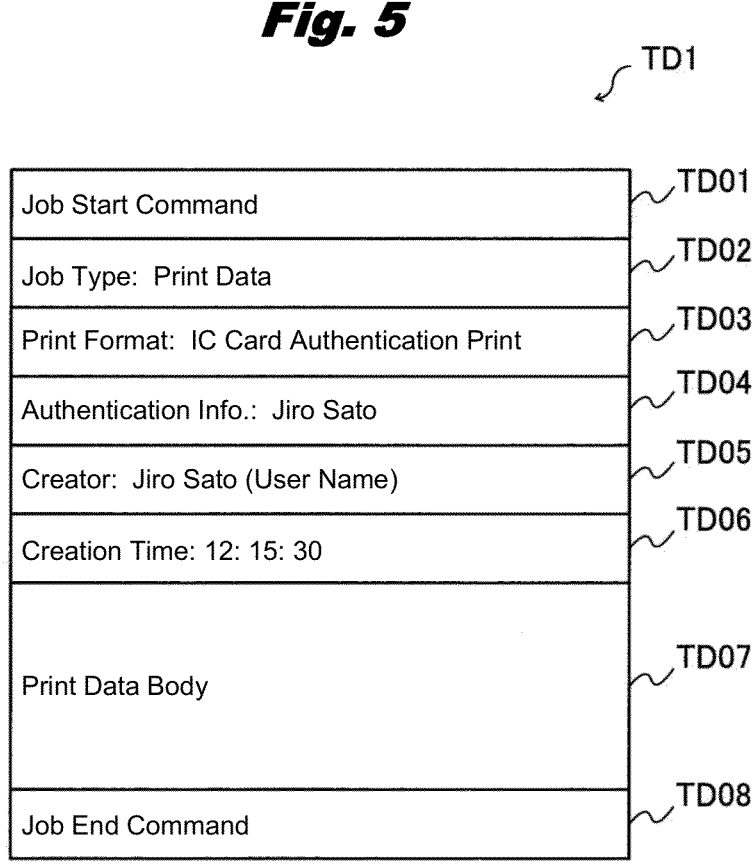
FIG. 5 is a schematic view showing a First Example of transmission data in Embodiment 1.

FIG. 5 is a schematic view showing a first example of the transmission data TD. Transmission data TD1, as described later, is the transmission data TD when a print output (image formation output) is not delegated to others. The transmission data TD1 is equipped with a job start command TD01, a job type TD02, a print format TD03, an identification information TD04, a creator TD05, a creation time TD06, a print data body TD07 and a job end command TD08.

The job start command TD01 indicates a command for starting a print job (image forming job). The job type TD02 indicates a job type. The print format TD03 indicates a print format (format of image formation). In Embodiment 1, the print format includes an IC card authentication print (IC card authentication image formation) requiring authentication for a print output, and a normal print (normal image formation) not requiring authentication for print output. The identification information TD04 indicates the first authentication information for authentication. The creator TD05 indicates the user name (login name) of the user who created the transmission data. The creation time TD06 indicates the time when the transmission data was created. The creation time TD may include the day, the month and the year when the transmission data was created. The print data body TD07 indicates the body of the print data. The job end command TD08 indicates the command for ending the print job. In the transmission data TD1 shown in FIG. 5, the first authentication information (Jiro Sato) indicated with the identification information TD04 and the user name (Jiro Sato) indicated with the creator TD05. This indicates that the creator himself/herself of the print data receives authentication upon the print output and the print output will not be delegated to others.

Figure 6:
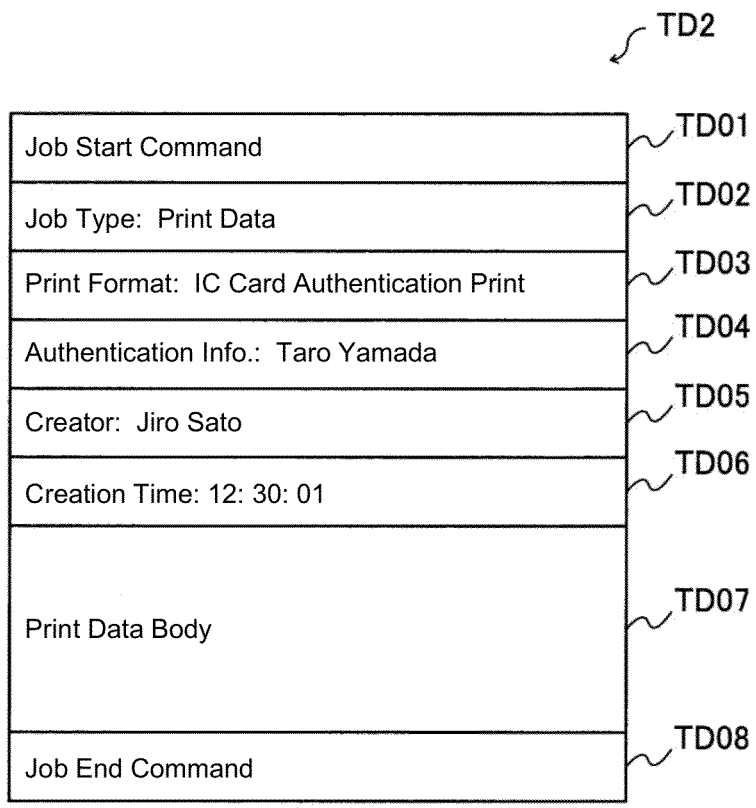
FIG. 6 is a schematic view showing a Second Example of transmission data in Embodiment 1.

FIG. 6 is a schematic view showing a second example of the transmission data TD. The transmission data TD2 shown in FIG. 6, as described later, is the transmission data TD in the case when the print output is delegated to others. Furthermore, the data structure of the transmission data TD2 shown in FIG. 6 is similar to that of the transmission data TD1 shown in FIG. 5. Herein, in the transmission data TD2 shown in FIG. 6, the first authentication information (Taro Yamada) indicated by the identification information TD04 and the user name (Jiro Sato) indicated by the creator TD05 are different. This indicates that a different party from that of the creator of the print data receives authentication upon the print output, and the printout is delegated to others. As the identification information, other than the user name, a form to grant a character string, such as "PRTJiro Sato*" in FIG. 5 or "PRTTaro Yamadadlg" in FIG. 6 is also usable.

Returning to the explanation of FIG. 4, the input 135 accepts operational input. In Embodiment 1, the input 135 accepts an entry of the delegation destination identification information indicating a delegation destination of the image formation output. The display 136 performs display.

The user PC 130 can be realized by the information processor 190 shown in FIG. 2. For example, the communication part 131 can be realized by the NIC 191. The user authentication processor 132 and the printer driver 133 can be realized by reading a pre-defined program stored in the HDD 192 or the ROM 193 by the CPU 195 into the RAM 194, and by executing the program. The memory 134 can be realized by the HDD 192, the ROM 193 or the RAM 194. The input 135 can be realized by the input device 196. The display 136 can be realized by the display device 197.

Figure 7:
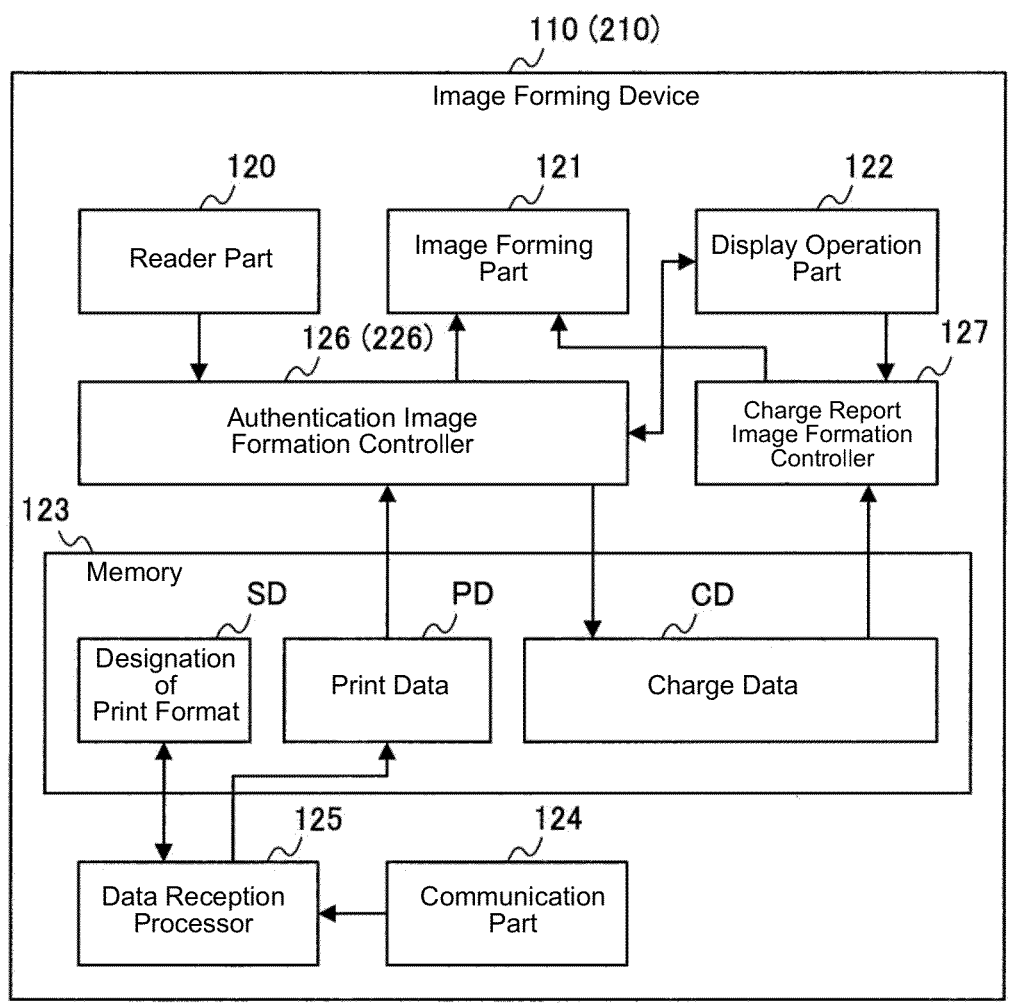
FIG. 7 is a block diagram schematically showing the functional configuration of the image forming device in Embodiments 1 and 2.

FIG. 7 is a block diagram schematically showing the functional configuration of the image forming device 110. Symbols within parentheses in FIG. 7 indicate the configuration of Embodiment 2. The image forming device 110 is equipped with a reader part 120, an image forming part 121, a display operating part 122, a memory 123, a communication part 124, a data reception processor 125, an authentication image formation controller 126 and a charge report image formation controller 127.

The reader part 120 reads information from an IC card. In Embodiment 1, the reader part 120 functions as an acquisition part that acquires second authentication information. The image formation part forms an image on a recording medium, such as paper. The display operating part 122 functions as a display that displays images and an operation part that accepts operational entry.

The memory 123 stores various data. For example, in Embodiment 1, the memory 123 stores information SD indicating a designation of a print format (image formation format), print data (image formation data) PD and charge data CD. The charge data CD is able to include various types of information as long as the information relates to the amount of bill for the printing process. In an ordinary process, the charge data CD is calculated at every printing process. Then, an invoice or bill is to be issued to the user at the end of process or to be accumulated and periodically issued. The information SD indicating a designation of a print format is information that is sent from the user PC 130. The print data PD is data where the transmission data TD that has been sent from the user PC 130 is stored in the memory 123, and the contents are similar to the transmission data TD (see FIGS. 5 and 6). The charge data CD is data where charging information based upon printing results (image formation results) are recorded. The information SD indicating the designation of a print format and the charge data CD will be explained later in detail. The communication part 124 functions as a transmission part and a reception part for sending and receiving data with the network 180.

The data reception processor 125 processes the data received via the communication part 124. For example, the data reception processor 125 stores the information SD indicating the designation of a print format received via the communication part 124 in the memory 123. Further, the data reception processor 125 stores the transmission data TD received via the communication part 124 in the memory 123 as print data PD. The authentication image formation controller 126 is an authentication part that performs authentication using the first authentication information contained in the print data PD, and that permits image formation based upon the print data PD when this authentication is successful. For example, the authentication image formation controller 126 controls to print (image formation) and to delete the print data PD having "identification information" corresponding to information read by the reader part 120. Further, the authentication image formation controller 126 creates the charge data CD based upon printing results, and stores the data in the memory 123. The charge report image formation controller 127 is a charge report creation part that creates a charge report from the charge data CD stored in the memory 123, and that controls the printing.

A function(s) of the image forming device 110 shown in FIG. 7 can be realized by the hardware of the image forming device 110 shown in FIG. 2. For example, the reader part 120 can be realized by the card reader 111. The image formation part 121 can be realized by the printing equipment 112. The display operating part 122 can be realized by the operating panel 113. The memory 123 can be realized by the HDD 115, the ROM 117 and the RAM 118. Furthermore, it is preferable that the print data PD and the charge data CD be permanently stored within the HDD 115. The communication part 124 can be realized by the NIC 116. The data reception processor 125, the authentication image formation controller 126 and the charge report image formation controller 127 can be realized by reading a program stored in the HDD 115 or the ROM 117 into the RAM 118, and by executing the program.

(Explanation of operation) Hereafter, operation in the image forming system 100 is explained with reference to the drawings.

Figure 8:
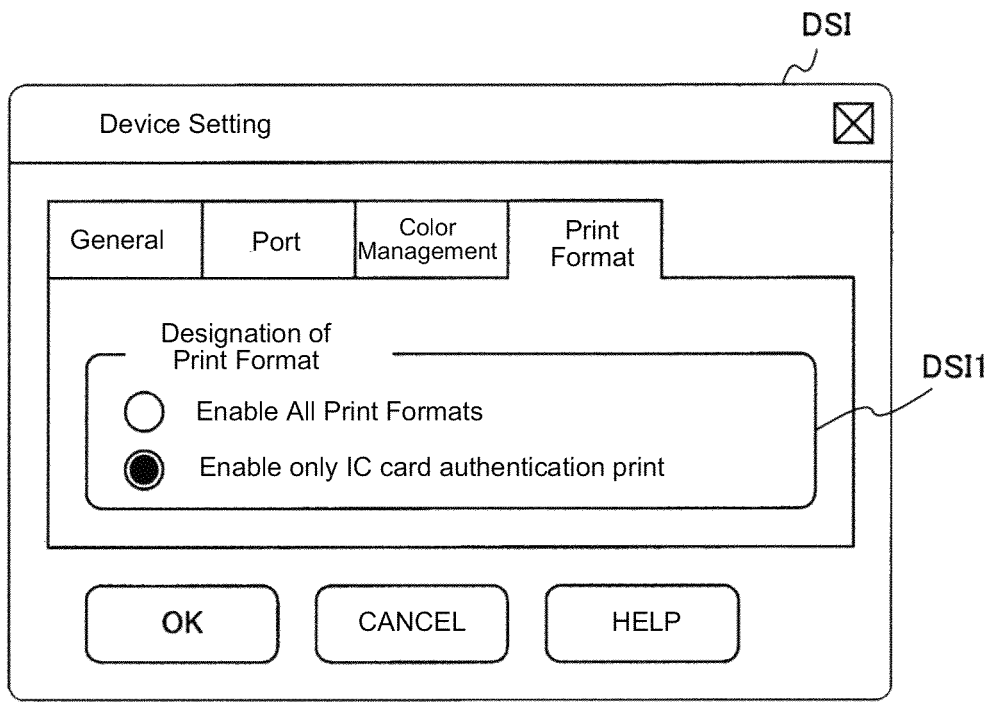
FIG. 8 is a schematic view showing one example of a device setting screen on a printer driver operating on the user PC in Embodiment 1.

(Device setting) FIG. 8 is a schematic view showing one example of a device setting screen DSI in the printer driver 133 operating on the user PC 130. The printer driver 133 displays the device setting screen DSI on the display 136, and acquires the designation of a print format entered via the input 135. In the designation region DSI1 of a print format on the device setting screen DSI, when the setting to "Enable all printing formats" is selected, the printer driver 133 is set so as to accept all printing formats. When the setting to "Enable only IC card authentication print" is selected, the printer driver 133 is set to accept only the IC card authentication print, and to reject other printing formats. The printer driver 133 sends information indicating the designation of a print format set as mentioned above to the image forming device 110 by the communication part 131. In the image forming device 110, the data reception processor 125 stores the information SD indicating the designation of a print format received via the communication part 124 in the memory 123.

Figure 9:
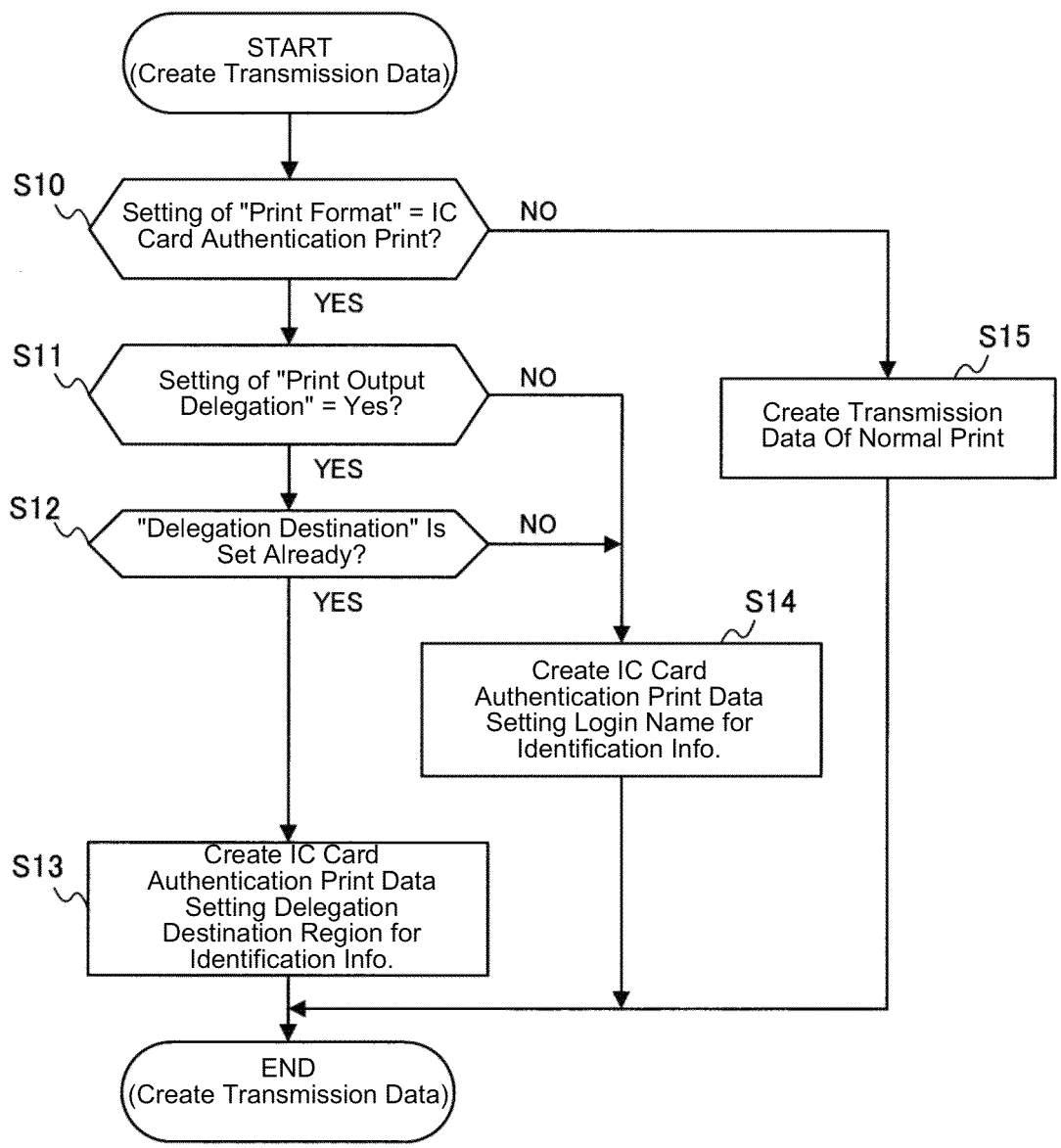
FIG. 9 is a flowchart showing the creation process of transmission data in the printer driver in Embodiment 1.

(Creation of transmission data TD) FIG. 9 is a flowchart showing the creation process of the transmission data in the printer driver 133. For example, the flowchart in FIG. 9 starts when the input 135 of the user PC 130 accepts an entry of a printing instruction (image formation instruction).

Figure 10:
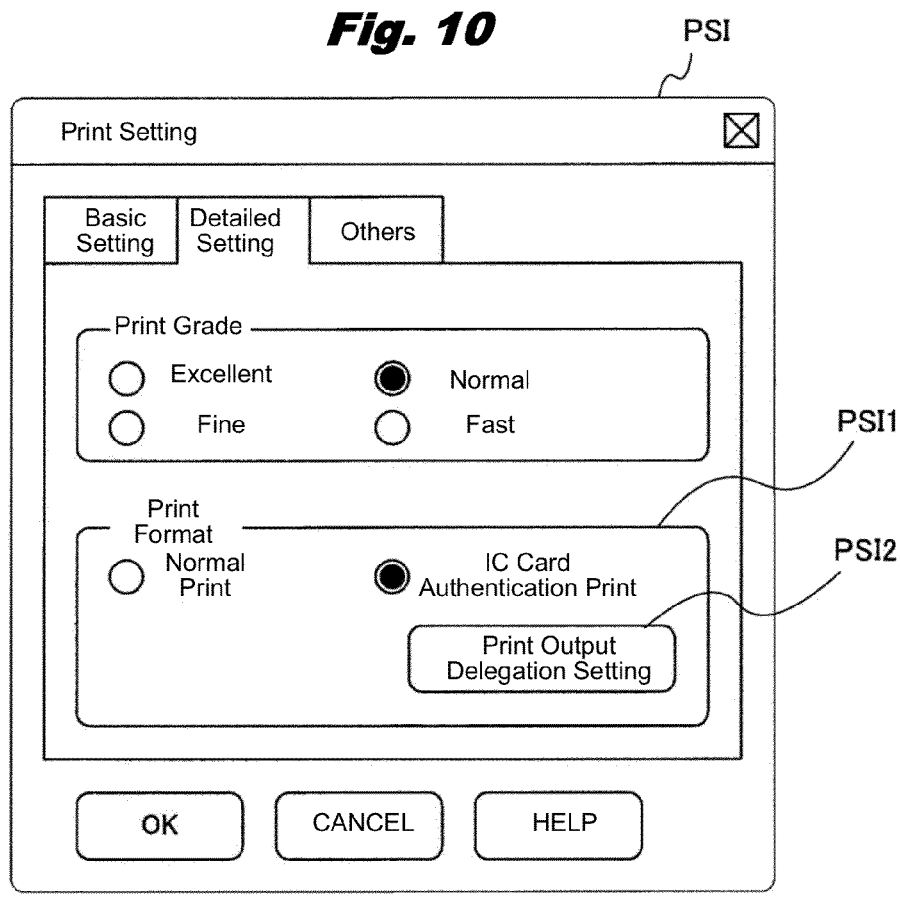
FIG. 10 is a schematic view showing one example of a print setting screen in Embodiment 1.

First, the printer driver 133 determines whether the setting of the "print format" is "IC card authentication print" (S10). For example, when the input 135 accepts the entry of a printing instruction, the printer driver 133 displays the print setting screen (image formation setting screen) on the display 136. FIG. 10 is schematic view showing one example of the print setting screen. On a print setting screen PSI shown in FIG. 10, in a print format region PSI1, a print format can be selected. Then, the printer driver 133, when "normal print" is selected in the print format region PSI1 (S10: No), proceeds to Step S15 in order to create the transmission data of normal print without authentication by an IC card. In the meantime, when "IC card authentication print" is selected (S10: Yes), the printer driver 133 proceeds to Step S11 in order to create the transmission data of the IC card authentication print requiring the authentication by the IC card.

Figure 11:
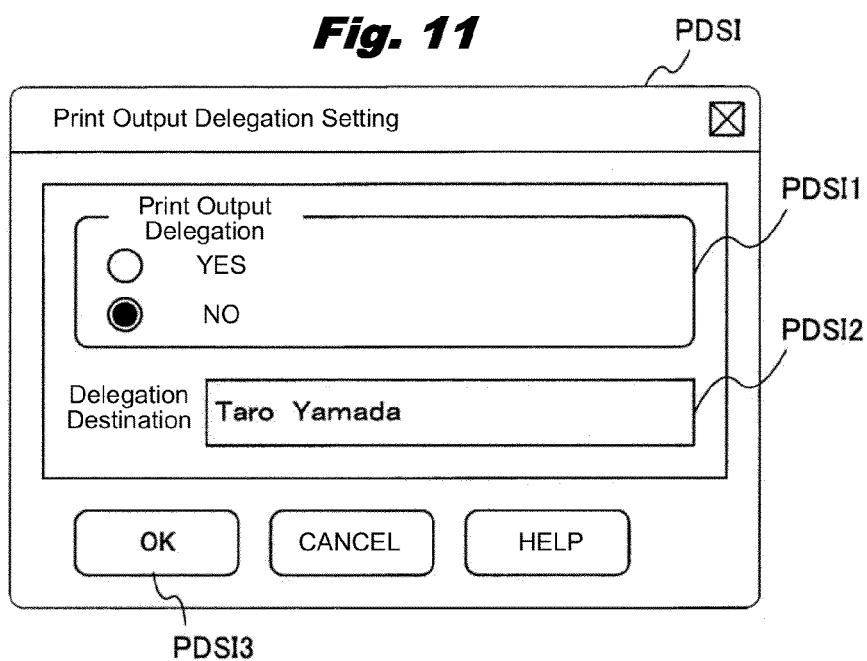
FIG. 11 is a schematic view showing one example of a print output delegation setting screen in Embodiment 1.

At Step S11, the printer driver 133 determines whether the setting of "print output delegation" is "YES". For example, when "IC card authentication print" is selected on the print setting screen PSI shown in FIG. 10, delegation of print output can be set. For example, if the print output delegation setting region PSI2 is selected and an execution instruction is entered, the print output delegation setting screen is displayed on the display 136. FIG. 11 is a schematic diagram showing one example of the print output delegation setting screen. On the print output delegation setting screen PDSI shown in FIG. 11, whether the print output is delegated can be set in a print output delegation region PDSI1. Then, the printer driver 133, when "YES" is selected in the print output delegation region PDSI1 (S11: Yes), proceeds to Step S12. In the meantime, the printer driver 133, when "NO" is selected in the print output delegation region PDSI1 (S11: No), proceeds to Step S4.

At Step S12, the printer driver 133 determines whether "delegation destination" is set. For example, when an account name of a delegation destination is entered in the delegation destination region PDSI2 of the print output delegation setting screen PDSI shown in FIG. 11, if an entry of execution instruction that has selected an OK region PDSI3 (S12: Yes), the printer driver 13 proceeds to Step S13. In the meantime, if no account name of the delegation destination is entered to the delegation destination region PDSI2 and an entry of execution instruction that has selected an OK region PDSI3 (S12: No), the printer driver 133 proceeds to Step S14.

At Step S13, the printer driver 133 creates the transmission data TD for IC authentication print (see FIG. 6) where contents of the delegation destination region entered into the delegation destination region PDSI2 as the identification information TD04 of the print job is set.

At Step S14, the printer driver 133 creates the transmission data TD for IC card authentication print (see FIG. 5) where the login name LN stored in the memory 134 as the identification information TD04 of the print data is set.

At step S15, the printer driver 133 creates the transmission data TD for normal print without requiring authentication by an IC card for print output. In the transmission data TD for normal print, although not illustrated, the print format TD03 (see FIG. 5 or FIG. 6) is set to "Normal print".

Furthermore, the printer driver 133 stores the transmission data TD created in any of Steps S13 to S15 in the memory 134. Further, the communication part 131 sends the transmission data TD to the image forming device 110 according to an instruction from the printer driver 133.

Figure 12:
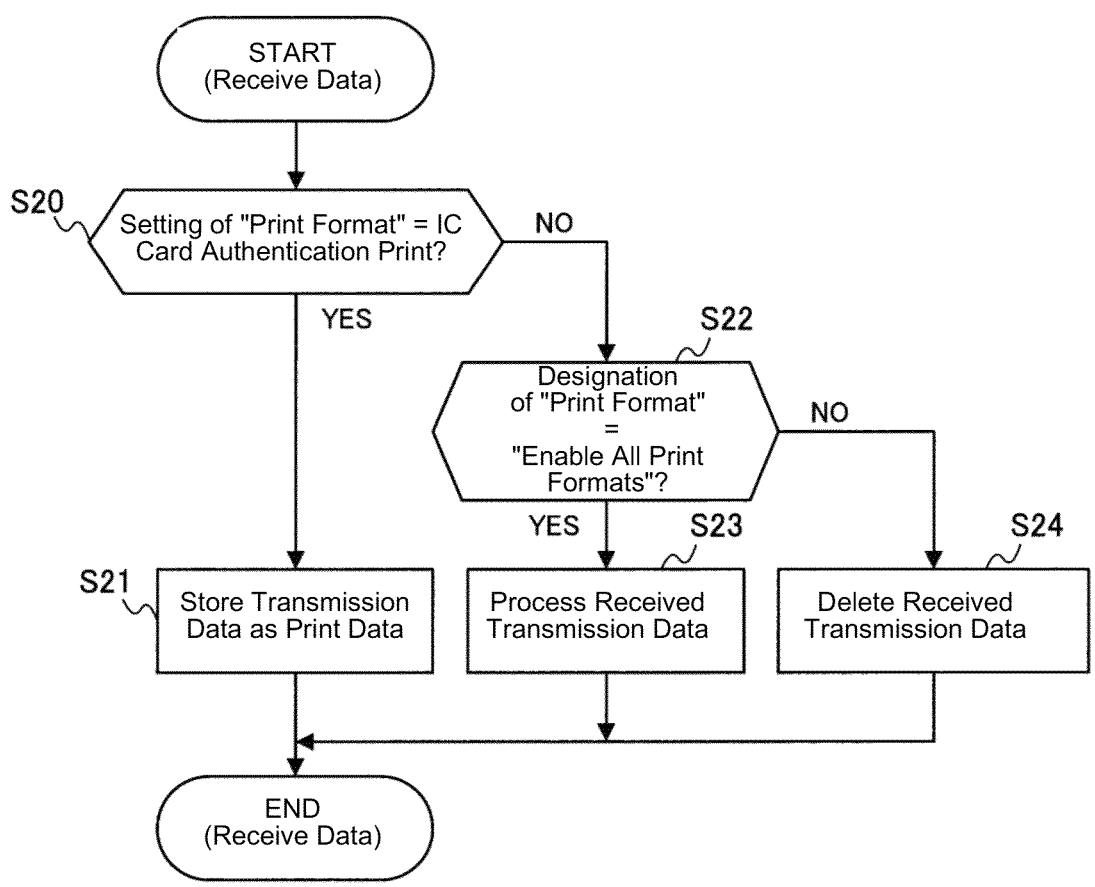
FIG. 12 is a flowchart showing the occasion of receiving data by a data reception processor in Embodiment 1.

(Data reception) FIG. 12 is a flowchart showing a process on the occasion when the data reception part 125 of the image forming device 110 receives data. The flowchart in FIG. 12 starts when the data reception processor 125 receives the transmission data TD via the communication part 124.

First, the data reception processor 125 determines whether the print format TD03 of the received transmission data TD indicates "IC card authentication print" (S20). When the print format TD03 indicates "IC card authentication print" (S20: Yes), the process moves to Step S21. When the print format TD03 does not indicate "IC card authentication print" (S20: No); in other words, when the print format TD03 indicates "Normal print", the process moves to Step S22.

At Step S21, the data reception processor 125 stores the received transmission data TD in the memory 123 as the print data PD.

At Step S22, the data reception processor 125 determines whether the designation of a print format is "Enable all print formats". As described above, information indicating the designation of a print format selected in the designation region DSI1 of the print format on the device setting screen DSI shown in FIG. 8 is pre-sent from the user PC 130. Consequently, the data reception processor 125 checks the information SD indicating the designation of a print format stored in memory 123. When the designation of the print format is "Enable all print formats" (S22: Yes), the process moves to Step S23. When the print format is not "Enable all print formats" (S22: No); in other words, when the designation of the print format is "Enable only IC card authentication print", the process moves to S24.

At Step S23, the image forming device 110 processes the received transmission data TD. For example, the data reception processor 125 sends the received transmission data TD to the image forming part 121 as the print data PD. The image forming part 121 performs printing based upon provided print data. At Step S24, the data reception processor 125 rejects/deletes the received transmission data TD.

Figure 13:
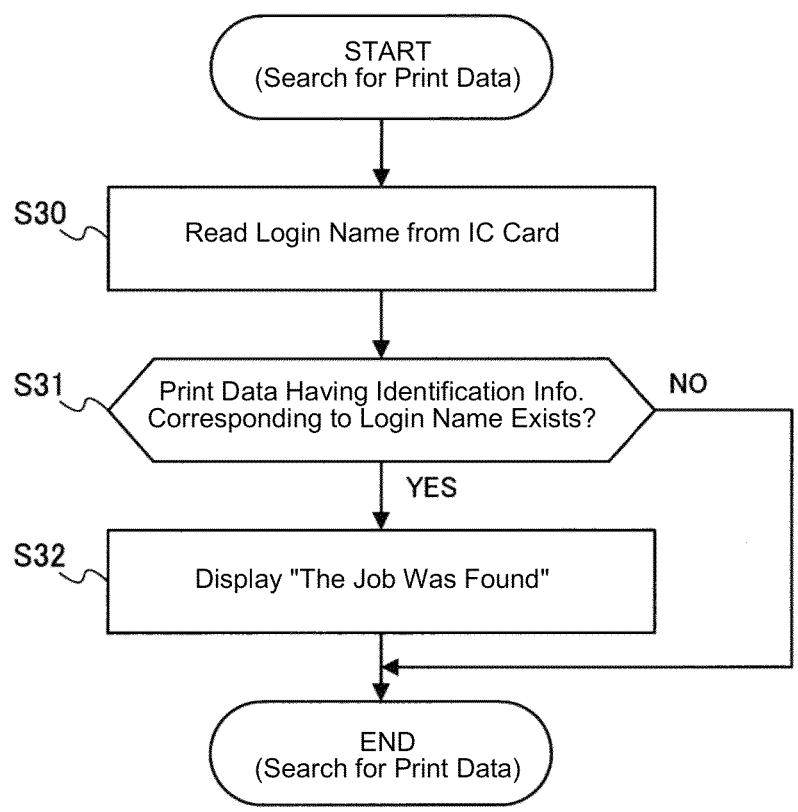
FIG. 13 is a flowchart showing the print data search process of an authentication image formation controller in Embodiment 1.

(Search for print data) FIG. 13 is a flowchart showing the print data searching processing of the authentication image formation controller 126. The flowchart shown in FIG. 13, for example, starts when there is an instruction to start the IC card authentication print. A user, for example, can instruct to start the IC card authentication print by making the IC card readable by the reader part 120. Furthermore, information corresponding to the login name LN in the user PC 130 is recorded in the IC card. In a recent office environment, configuration where an IC card where an employee number is recorded is used as an employee ID card and the employee number is used for a PC account name (a login name), as well, has become widely used. In other words, the same information as "login name" to the PC is also recorded in the IC card. In Embodiment 1, the login name stored in the IC card is used as the second authentication information.

First, the reader part 120 reads "login name" stored in the IC card (S30). The read "login name" is sent to the authentication image formation controller 126.

The authentication image formation controller 126 checks the identification information TD04 of the print data PD stored in the memory 123, and determines whether the print data PD having the identification information TD04 corresponding to (for example, matched with) the read "login name" exists (S31). When such print data PD exists (S31: Yes), the process moves to Step S32 by assuming that the authentication succeeded, displaying "The Job was found." When such print data PD does not exist (S31: No), the flow ends by assuming that the authentication failed. When such print data PD does not exist and the flow ends, for example, the screen displayed on the display operating part 122 remains as the standby screen I01 shown in FIG. 14 and will not be transitioned. As described above, in the implementation of the present invention, correspondence between the identification information and "login name" does not have to match. As long as the controller is able to determine that the user executing the print process has been authenticated, and proceeds in following procedures, the status is defined as "corresponding." Another example of the corresponding status may be where the login name includes the identification information.

Figure 14:
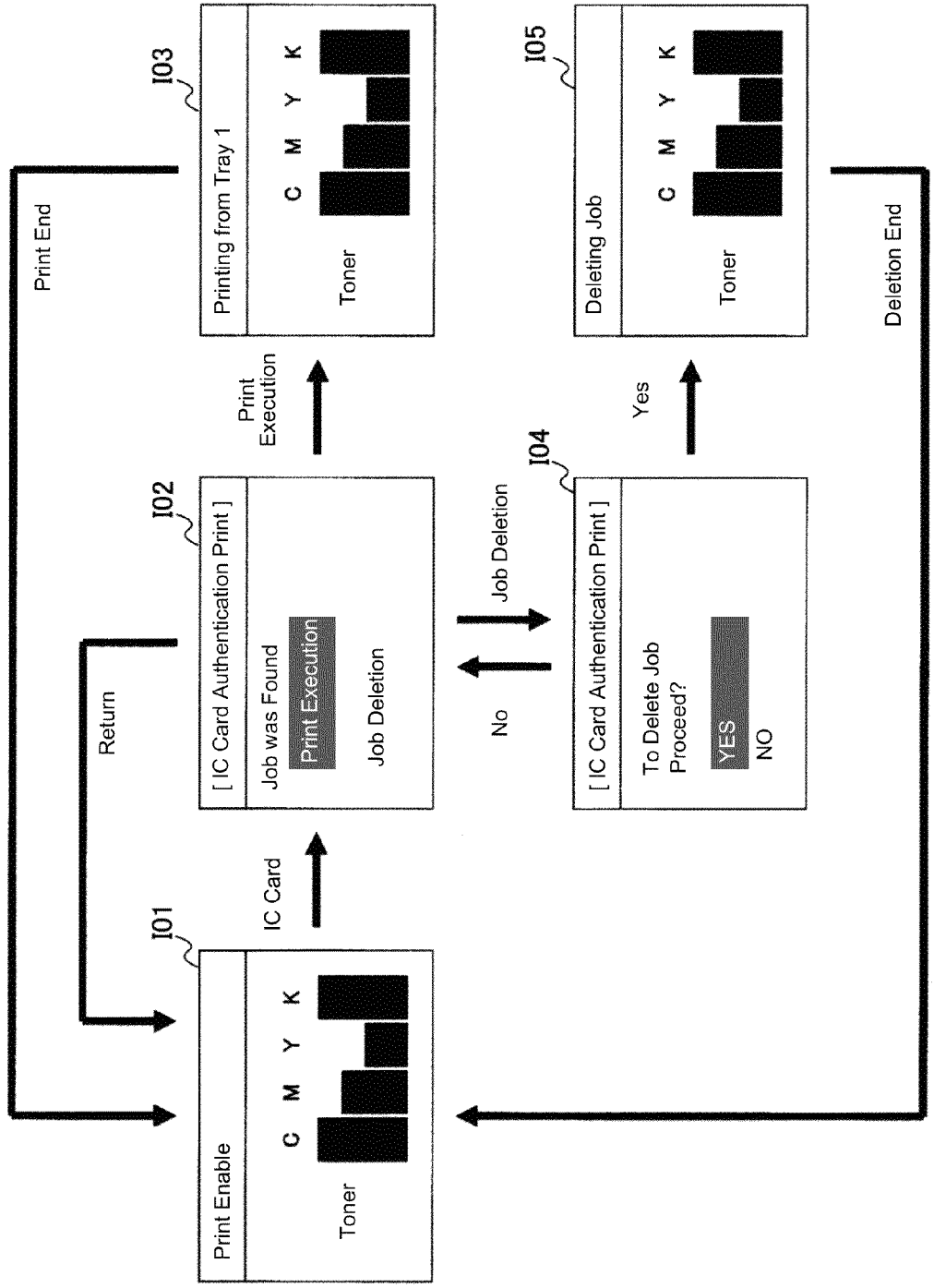
FIG. 14 is a schematic view showing screen transition upon execution of IC card authentication printing in Embodiment 1.

At Step S32, the authentication image formation controller 126 makes the screen display on the display operating part 122 transition from the standby screen I01 shown in FIG. 14 to the job detection screen 102 shown in FIG. 14.

(Execution of IC card authentication print) A user can select "Execute print" and "Delete job" by pressing the UP or DOWN keys 113 and 113c of the operating panel 113 (see FIG. 3) under the situation where the job detection screen 102 shown in FIG. 14 is displayed on the display operating part 122. Then, if the SER key 113d is pressed under the situation where "Execute Print" has a focus on the job detection screen 102 shown in FIG. 14, the authentication image formation controller 126 sends the print data PD detected at Step S31 in FIG. 13 to the image forming part 121, and printing is executed. In such a case, the authentication image formation controller 126 makes the screen displayed on the display operating part 122 transition from the job detection screen 102 shown in FIG. 14 to a printing screen 103. In the meantime, if the SET key 113d is pressed under the condition where "Delete job" has a focus on the job detection screen 102 shown in FIG. 14, the authentication image formation controller 126 makes the screen displayed on the display operating part 122 transition from the job detection screen 102 shown in FIG. 14 to a deletion confirmation screen 104 shown in FIG. 14. A user can select "Yes" (agree to deletion) or "No" (disagree to deletion) by pressing the UP and DOWN keys 113b and 113c on the operating panel 113 under the condition where the deletion confirmation screen 104 shown in FIG. 14 is displayed. Then, if the SET key 113d under the situation where "Yes" has a focus on the deletion confirmation screen 104 shown in FIG. 14, the authentication image formation controller 126 deletes the print data PD detected at Step S31 in FIG. 13. In such a case, the authentication image formation controller 126 makes a screen displayed on the display operating part 122 transition from the deletion confirmation screen 104 shown in FIG. 14 to a deleting screen 105.

Figures 15, 16:
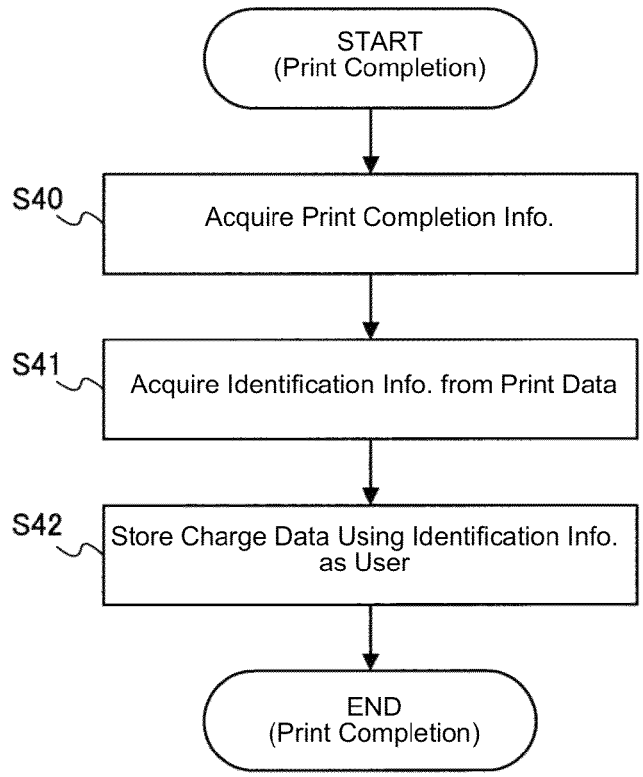
FIG. 15 is a flowchart showing a process upon completion of printing of the authentication image formation controller in Embodiment 1.
FIG. 16 is a schematic view showing a list of identification information, creators and creation times extracted from print data stored in a memory in Embodiment 1.

(Print Completion) FIG. 15 is a flowchart showing the process upon completion of printing of the authentication image formation controller 126. The flowchart shown in FIG. 15 starts when printing in the image formation part 121 is completed.

The authentication image formation controller 126 acquires print completion information including size of a recording medium, printed color(s) and the number of ejected sheets from the image formation part 121 after the completion of printing (S40). In addition, the authentication image formation controller 126 acquires the identification information TD04 from the print data PD where printing is completed (S41). Then, the authentication image formation controller 126 creates charge data CD using the identification information TD04 as "user", and stores the charge data CD in the memory 123 (S42).

The creation of the charge data CD is explained in detail using FIGS. 16 and 17. FIG. 16 is a list of the identification information TD04, the creator T05 and the creation time TD06 extracted from the print data PD stored in the memory 123. In FIG. 16, the print data PD with ID=04 corresponds to the transmission data TD1 shown in FIG. 5, and the print data PD with ID=5 corresponds to the transmission data TD2 shown in FIG. 6. When the IC card where "Taro Yamada" is "login name" is read by the reader part 120, as shown in FIG. 16, the print data PD with ID=2, 3 and 5 having "Taro Yamada" as the identification information TD04 will be subject for print. FIG. 17 is a schematic view showing charge data CD1 created by the authentication image formation controller 126 as a result of completing of printing these print data PD. In the charge data CD1, the identification information TD04 in the print data PD where printing is completed is stored as "user". In other words, a user who implements a print output is subject to being charged. The charge amount is determined based upon size, colors and the number of sheets indicated in print completion information acquired at Step S40 of FIG. 15.

Figure 18:
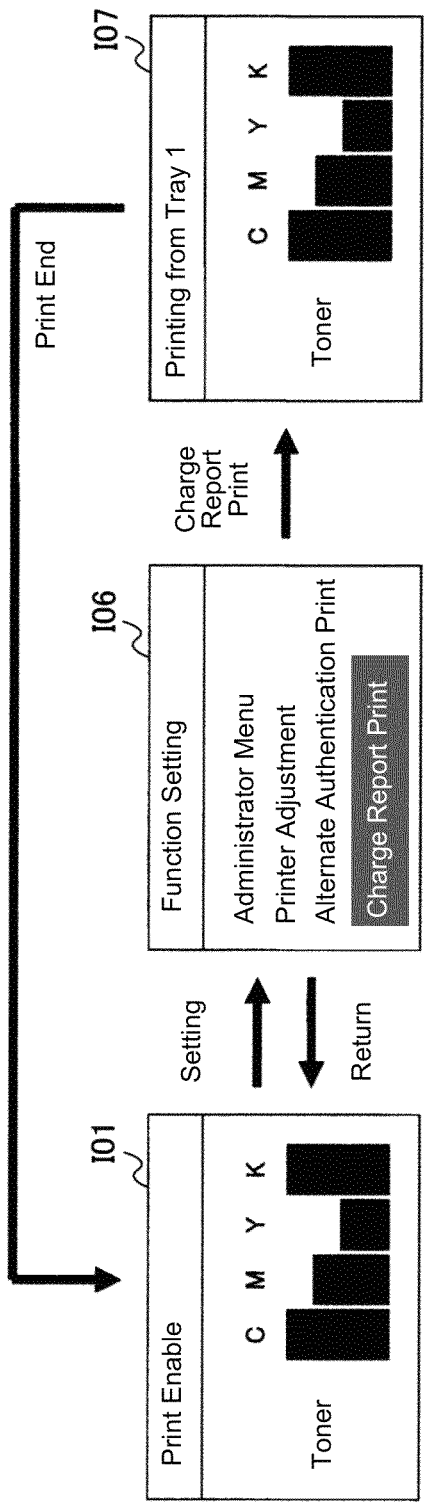
FIG. 18 is a schematic view showing the transition of a screen displayed on a display operating part on the occasion of printing a charging report.

(Print of charge data) FIG. 18 is a schematic view showing the transition of a screen displayed on the display operating part 122 on the occasion of printing the charge report. If the SET key 113d of the operating panel 113 (see FIG. 3) is pressed under the situation where the standby screen 101 shown in FIG. 18 is displayed on the display operating part 122, the screen displayed on the display operating part 122 is transitioned to a function setting screen 106 shown in FIG. 18. On the function setting screen 106 shown in FIG. 18, a user can select "Administrator menu", "Printer control", "Alternate authentication print" and "charge report print" by pressing the UP and DOWN keys 113b and 113c. Then, on the function setting screen 106 shown in FIG. 18, when the SET key 113d is pressed under the condition where the "charge report print" is focused, the screen displayed on the display operating part 122 is transitioned to the a printing screen 107 shown in FIG. 18. Then, the charge report image formation controller 127 creates a charge report by putting information stored in the charge data CD stored in the memory 123 in a pre-determined format. The charge report image formation controller 127 sends the created charge report to the image forming part 121, and allows printing of the report.

FIG. 19 is a schematic view showing one example of a charge report print result. A charge report CP1 shown in FIG. 19 is printed out based upon the charge data CD1 shown in FIG. 17.

Thus, according to the image forming system 100 relating to Embodiment 1, in the printer driver 133 of the user PC 130, a print output can be delegated to another user by designing it to enable to designate a delegation destination of the print output.

Embodiment 2 Hereafter, Embodiment 2 will be described.

(Explanation of Configuration) As shown in FIG. 1, an image forming system 200 relating to Embodiment 2 is equipped with an image forming device 210, the user PC 130, the administrator PC 150 and the authentication server 170. The image forming system 200 relating to Embodiment 2, in the image forming device 210, is different from the image forming system 100 relating to Embodiment 1. Furthermore, hardware configuration of the image forming device 210 in Embodiment 2 is similar to that of the image forming device 110 shown in FIG. 2.

As shown in FIG. 7, the image forming device 210 in Embodiment 2 is equipped with the reader part 120, the image forming part 121, the display operating part 122, the memory 123, the communication part 124, the data reception processor 125, an authentication image forming controller 226 and the charge report image formation controller 127. The image forming device 210 in Embodiment 2 is different from the image forming device 110 in Embodiment 1 in a process with the authentication image formation controller 226.

The authentication image formation controller 226 in Embodiment 2 performs a process substantially similar to that of the authentication image formation controller 126 in Embodiment 1, but is different from the authentication image formation controller 126 in Embodiment 1 in a creation process of charge data at the time of print completion.

(Explanation of movement) Movement of the imaging forming system 200 relating to Embodiment 2 is substantially similar to the movement of the image forming system 100 in Embodiment 1, but since the processing at the time of completion of printing is different, hereafter, a process at the time of completion of printing is explained.

Figure 20:
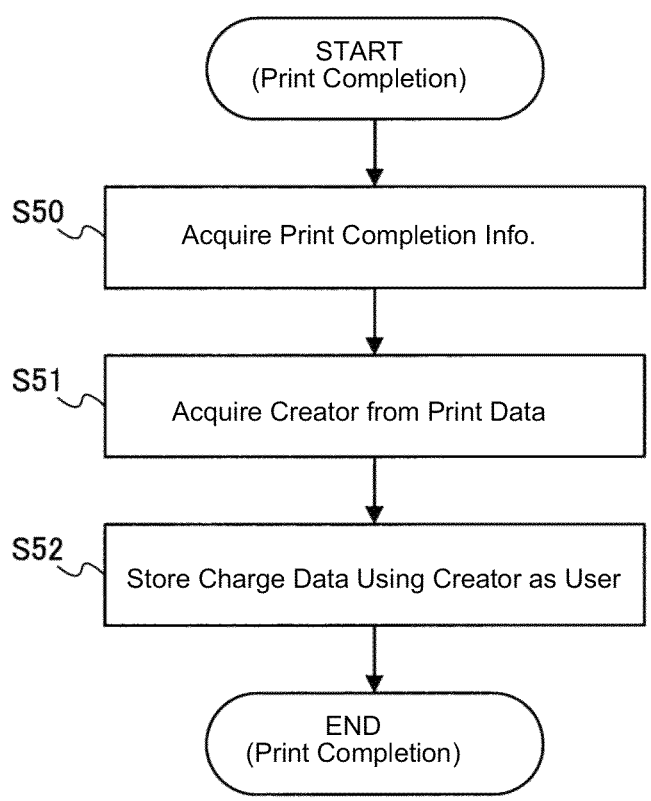
FIG. 20 is a flowchart showing a process upon print completion of the authentication image formation controller in Embodiment 2.

(Print completion) FIG. 20 is a flowchart showing the process of the authentication image formation controller 226 at the time of print completion. The flowchart shown in FIG. 20 starts when the printing at the image forming part 121 is completed.

The authentication image formation controller 226 acquires print completion information including size of a recording medium, printed color(s) and the number of ejected sheets from the image forming part 121 after the print completion (S50). In addition, the authentication image formation controller 226 acquires a creator TD05 from the print data PD where printing is completed (S51). Then, the authentication image formation controller 226 creates the charge data CD using the creator TD05 as "user", and stores the charge data CD in the memory 123 (S52).

Creation of the charge data CD is explained in detail using FIGS. 16 and 21. When the IC card where "Taro Yamada" is "login name" is read by the reader part 120, as shown in FIG. 16, the print data PD with ID=2, 3 and 5 having "Taro Yamada" as the identification information TD04 is subject for printing. FIG. 21 is a schematic view showing charge data CD2 that is created by the authentication image formation controller 226, as a result of completion of printing of these print data PD. In the charge data CD2, the creator TD05 of the print data PD where the printing is completed is stored as "user". In other words, a user of the delegation destination where the printout is delegated is subject to being charged.

FIG. 22 is a schematic view showing one example of charge report print results. The charge report CP2 shown in FIG. 22 is printed based upon the charge data CD2.

As mentioned above, according to Embodiment 2, generating unintended charges at the delegation destination by charging the delegation origin of a print output and suffering a loss can be prevented.

Embodiment 3 Hereafter, Embodiment 3 is explained.

(Explanation of configuration) As shown in FIG. 1, an image forming system 300 relating to Embodiment 3 is equipped with an image forming device 310, the user PC 130, an administrator PC 350 and authentication server 170. The image forming system 300 is different from the image forming system 100 relating to Embodiment 1 in an image forming device 310 and the administrator PC 350. Furthermore, hardware configuration of the image forming device 310 in Embodiment 3 is similar to that of the image forming device 110 shown in FIG. 2, and the hardware configuration of the administrator PC 350 in Embodiment 3 is similar to that of the information processor 190 shown in FIG. 2.

Figure 23:
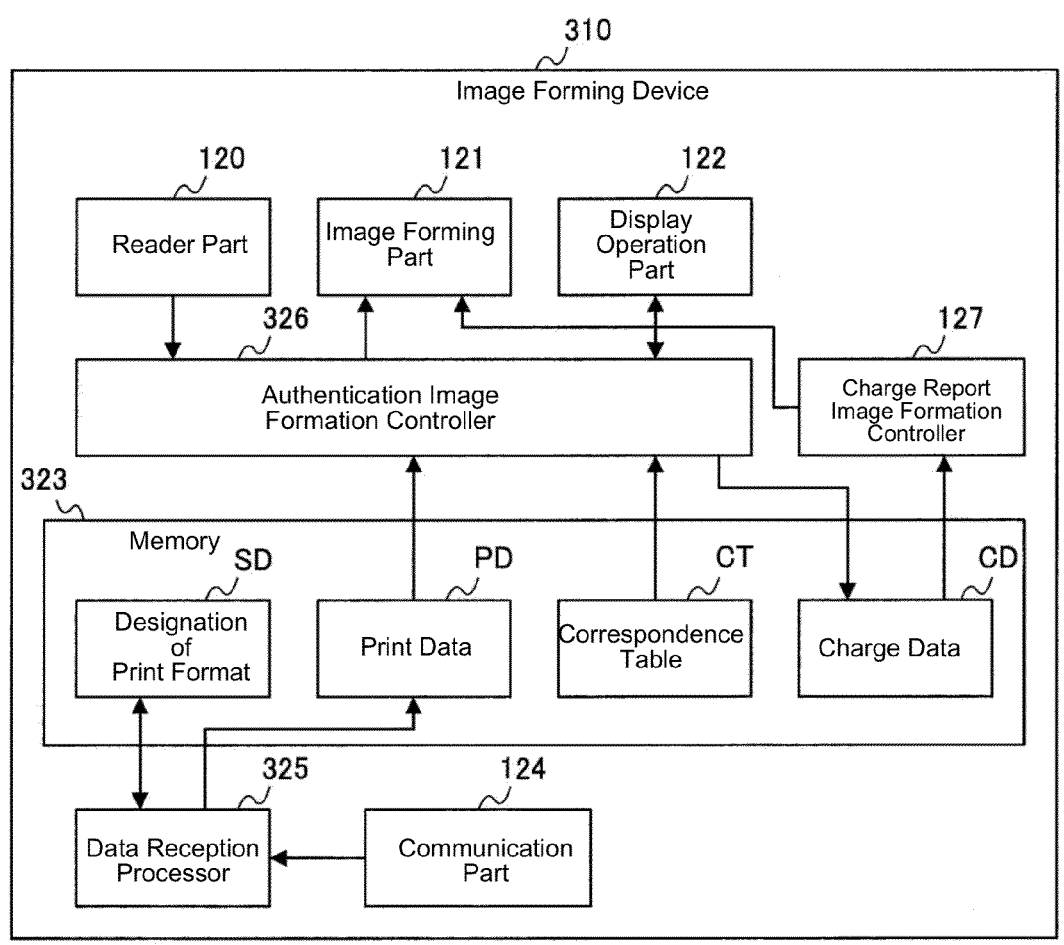
FIG. 23 is a block diagram schematically showing the functional configuration of an image forming device in Embodiment 3.

FIG. 23 is a block diagram schematically showing the functional configuration of the image forming device 310. The image forming device 310 in Embodiment 3 is equipped with the reader part 120, the image forming part 121, the image operation part 122, a memory 323, the communication part 124, a data reception processor 325, an authentication image formation controller 326 and a charge report image formation controller 127. The image forming device 310 in Embodiment 3 is different from the image forming device 110 in Embodiment 1 in a point of the data that is stored in the memory 323, and, in points of the data reception processor 325 and the authentication image formation controller 326.

Figure 24:
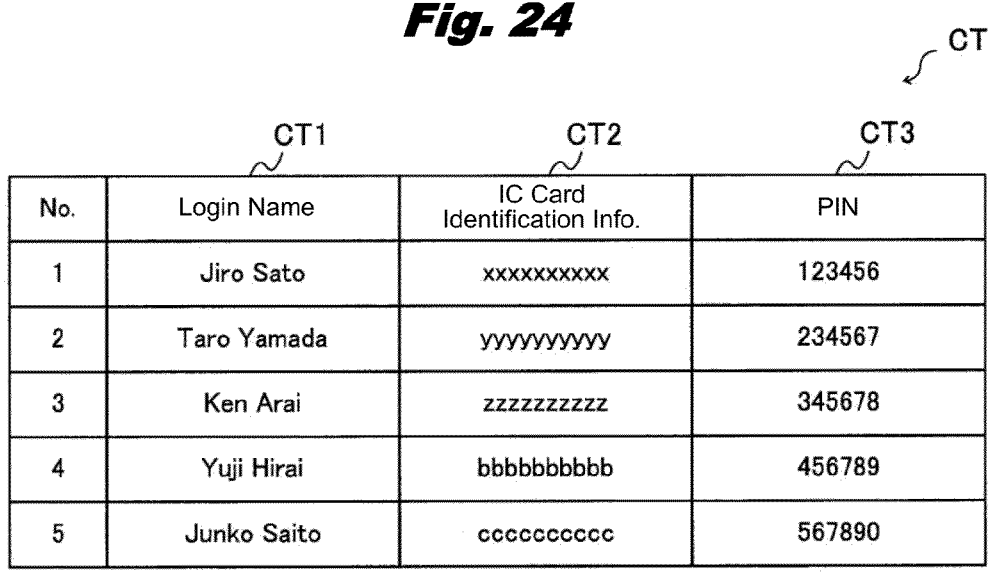
FIG. 24 is a schematic view showing one example of a correspondence table in Embodiment 3.

The memory 323, similar to Embodiment 1, stores the correspondence table CT unlike Embodiment 1, in addition to storing the information SD indicating a designation of a print format, the print data PD and the charge data CD. Furthermore, it is preferable that the correspondence table CT is permanently stored in the HDD 115. The correspondence table CT is data defining a correspondence relationship between information used for authentication print. FIG. 24 is a schematic view showing one example of the correspondence table CT. The correspondence table CT has a login name section CT1, an IC card identification information section CT2 and a PIN section CT3. The login name section CT1 stores login names. The login names stored in the login name section CT1 are also referred to as second authentication information. The IC card identification information section CT2 stores the IC card identification information that can only specify IC card owned by a user who is specified by a login name stored in the login name section CT1. Furthermore, in Embodiments 1 and 2, a login name is stored in the IC card, but in Embodiment 3, IC card identification information, which is different from a login name, is stored. The IC card identification information is also referred to as first identification information. A PIN section CT3 stores a personal identification number (PIN) as personal identification information for identifying a user who is specified with a login name stored in the login name section CT1. PIN is also referred to as second identification information.

Returning to FIG. 23, the data reception processor 325 receives correspondence table download data that is sent from the administrator PC 350 via the communication part 124, and creates a correspondence table CT from the data and stores the created correspondence table CT in the memory 323, other than performing the similar processing as that in Embodiment 1.

The authentication image formation controller 326 specifies a login name corresponding to the IC card identification information read by the reader part 120 from the correspondence table CT, and controls printing and deleting print data PD having "identification information" corresponding to (for example, matched with) the specified login name. Further, the authentication image formation controller 326 specifies a login name corresponding to a PIN entered via the display operation part 122 from the correspondence table CT, and controls printing and deleting print data having "identification information" corresponding to (for example, matched with) the specified login name.

Figure 25:
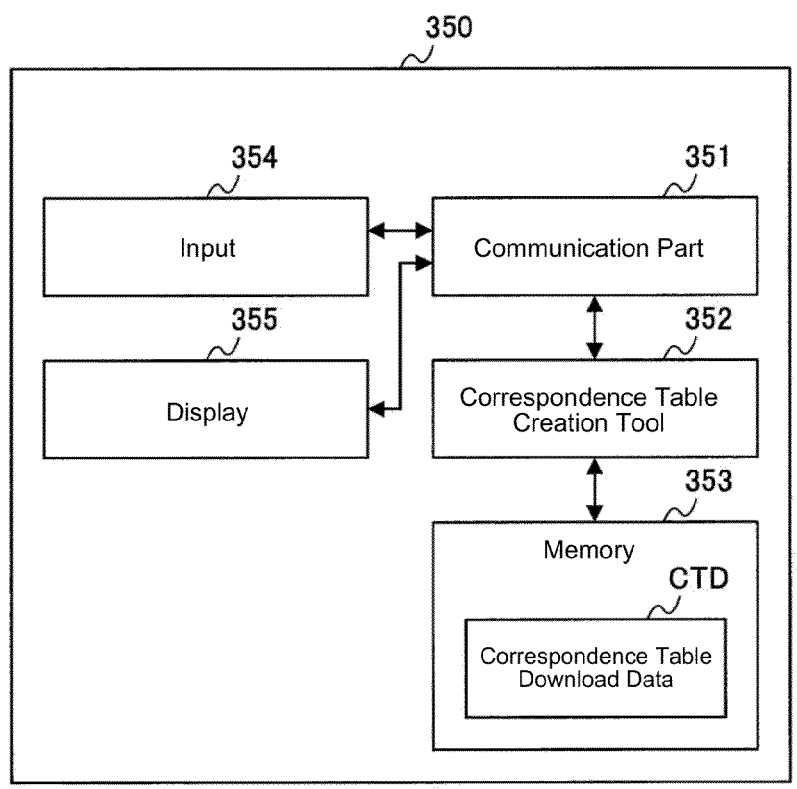
FIG. 25 is a block diagram schematically showing the functional configuration of an administrator PC in Embodiment 3.

FIG. 25 is a block diagram schematically showing the functional configuration of an administrator PC 350 in Embodiment 3. The administrator PC 350 is equipped with a communication part 351, a correspondence table creation tool 352, a memory 353, an input 354 and a display 355.

The communication part 351 functions as a transmission part and a reception part for sending and receiving data with the network 180. The correspondence table creation tool 352 is a correspondence creation part that creates the correspondence table CT. The memory 353 stores programs and data. For example, the memory 353 stores the correspondence table download data CTD. The correspondence table download data CTD is data for downloading information defined by the correspondence table creation tool 352 to the image forming device 110 via the network 180. The input 354 accepts an input of the operation. The display 355 performs display.

The administrator PC 350 can be realized by the information processor 190 shown in FIG. 2. For example, the communication part 351 can be realized by the NIC 191. The correspondence table creation tool 352 can be realized by reading a predetermined program stored in the HDD 192 or the ROM 193 into the RAM 194, and by executing the program. The memory 353 can be realized by the HDD 192, the ROM 193 or the RAM 194. The input 354 can be realized by the input device 196. The display 355 can be realized by the display device 197.

(Explanation of movement) The movement in the image forming system 300 relating to Embodiment 3 is substantially similar to that of the image forming system 100 in Embodiment 1, but since a point where a process to create the correspondence table CT and a process to execute alternative authentication print are required, and, a process to receive data and a process to search for the print data PD are different, these processes are explained hereafter.

(Creation of correspondence table) In Embodiment 3, information corresponding to "login name" in the user PC 130 is not recorded in an IC card. However, "IC card identification information" that can only specify the IC card is recorded in all IC cards. Furthermore, in Embodiment 3, the reader part 120 functions as an acquisition part that acquires "IC card identification information" from the IC card. Then, in the correspondence table creation tool 352, a correspondence relationship between "login name" in the user PC 130 and "IC card identification information" is defined. In addition, in order to enable "alternative authentication print" to implement the authentication print without using any IC card, by entering PIN into the display operation part 122 of the image formation device 310, the correspondence table creation tool 352 of the administrator PC 350 also defines the correspondence relationship between "login name" and "PIN". The correspondence table creation tool 352 displays a correspondence table creating screen on the display 355, and creates the correspondence table download data CTD by accepting an entry of necessary information via the input 354. FIG. 26 is a schematic view showing one example of the correspondence table creating screen. A correspondence table creating screen 108 has a login name entry region 1081, an IC card identification information entry region 1082 and a PIN entry region 1083. Then, corresponding "login name", "IC card identification information" and "PIN" are entered into the same row (record) of these regions, respectively, and when a SEND button 1084 is pressed, the correspondence table creation tool 352 creates the correspondence table download data CTD based upon the entered information, and stores [the data] in the memory 353. Then, the correspondence table creation tool 352 makes the communication part 351 send the stored correspondence table download data CTD to the image forming device 310. FIG. 27 is a schematic view showing one example of the correspondence table download data CTD. The correspondence table download data CTD indicates that "job classification" is "correspondence table download data", and in addition, indicates corresponding "login name", "IC card identification information" and "PIN" per record.

Figure 28:
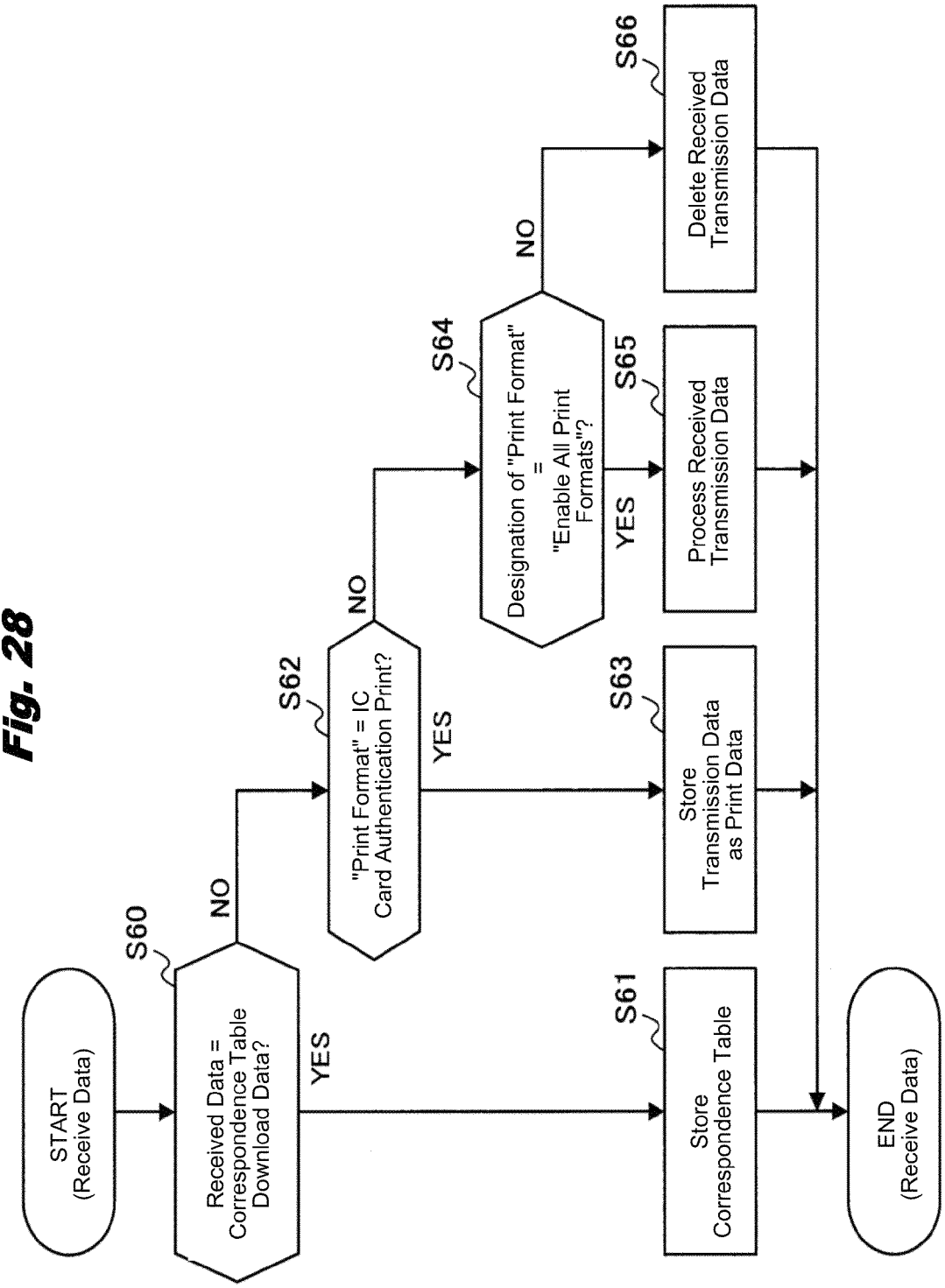
FIG. 28 is flowchart showing a process on the occasion of receiving data by a data reception processor in Embodiment 3.

(Data reception) FIG. 28 is a flowchart showing a process on the occasion of receiving data by the data reception processor 325 of the image forming device 310. The flowchart of FIG. 28 starts on the occasion of receiving data by the data reception processor 325 of the image forming device 310 via the communication part 124.

First, the data reception processor 325 determines whether the received data is the correspondence table download data CTD (S60). For example, the data reception processor 325 determines whether "Job classification" of the received data is "Correspondence table download data". When the received data is the correspondence table download data CTD (S60: Yes), the process moves to S61. When the received data is not the correspondence table download data CTD (S60: No); in other words, when the received data is the transmission data TD, the process moves to Step S62.

At Step S61, the data reception processor 325 creates the correspondence table CT from the received correspondence table download data CTD, and stores this correspondence table CT in the memory 323.

At Step S62, the data reception processor 325 determines whether the print format TD03 of the received transmission data TD indicates "IC card authentication print". When the print format TD03 indicates "IC card authentication print" (S62: Yes), the process moves to Step S63. When the print format TD03 does not indicate "IC card authentication print" (S62: No); in other words, when the print format TD03 indicates "Normal print", the process moves to Step S64.

At Step S63, the data reception processor 325 stores the received transmission data TD in the memory 323 as the print data PD.

At Step S64, the data reception processor 325 determines whether the designation of the print format is to "Enable all print formats". When the designation of the print format is "Enable all print formats" (S64: Yes), the process moves to Step S65. When the designation of the print format is not to "Enable all print formats" (S64: No); in other words, when the designation of the print format is to "Enable only IC card authentication print", the process moves to S66.

At Step S65, the image forming device 310 processes the received transmission data TD. For example, the data reception processor 325 sends the received transmission data TD to the image forming part 121 as the print data PD. The image forming part 121 performs printing based upon the provided print data PD. At Step S66, the data reception processor 325 rejects the received transmission data TD.

Figure 29:
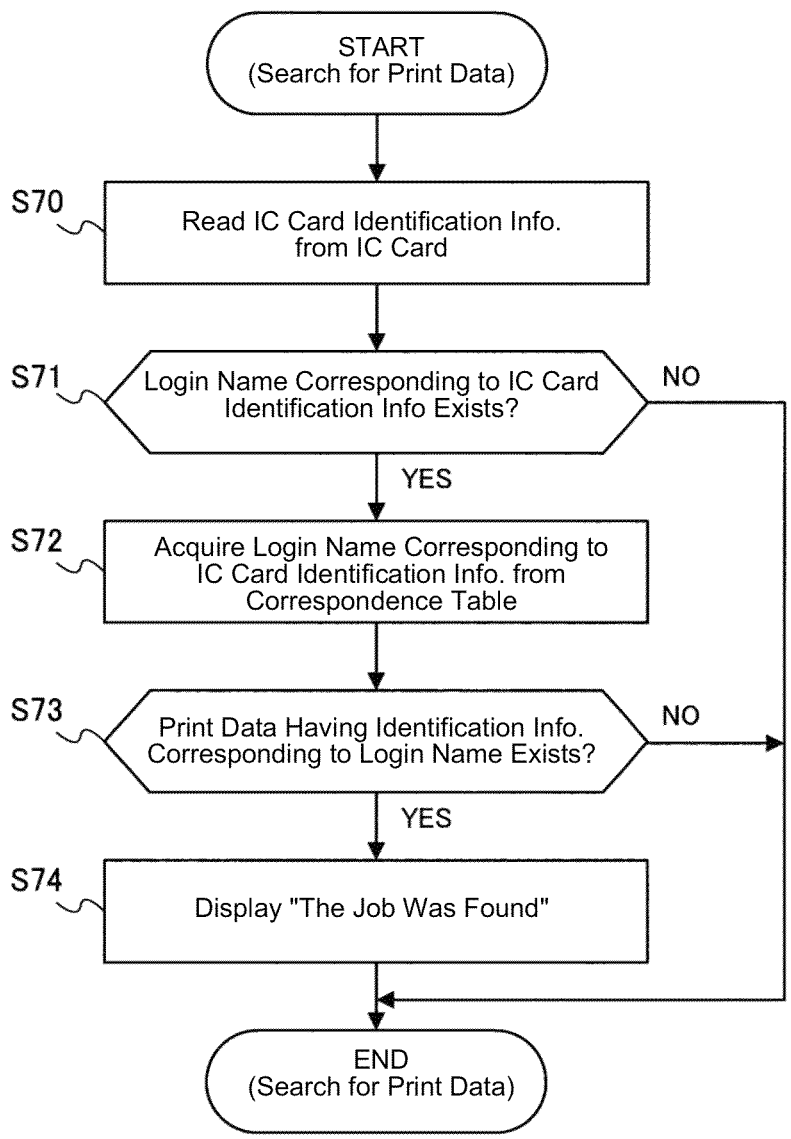
FIG. 29 is a flowchart showing a print data search process upon IC card authentication printing in Embodiment 3.

(Search for print data upon IC card authentication print) FIG. 29 is a flowchart showing print data searching process upon the IC card authentication printing of the authentication image formation controller 326. The flowchart shown in FIG. 29 starts, for example, when there is a start instruction of the IC card authentication print.

First, the reader part 120 reads "IC card identification information" stored in the IC card (S70). The read "IC card identification information" is sent to the authentication image formation controller 326.

The authentication image formation controller 326 determines whether "login name" corresponding to the IC card identification information read from the IC card exists in the correspondence table CT (S71). When such a "login name" is stored (S71: Yes), the process moves to Step S72. When such a "login name" is not stored (S71: No), the flow ends.

At Step S72, the authentication image formation controller 326 acquires "login name" corresponding to the IC card identification information that is read from the IC card, from the correspondence table CT. Then, the authentication image formation controller 326 checks the identification information TD04 of the print data PD stored in the memory 323, and determines whether the print data PD having the identification information TD04 corresponding to (for example, matched with) the acquired "login name" exists (S73). If such print data PD exists (S73: Yes), the process moves to Step S74, and if such print data PD does not exist (S73: No), the flow ends. When the flow ends because such print data PD does not exist, for example, the screen displayed on the display operation part 122 is not transitioned but remains as the standby screen I01 as shown in FIG. 14.

At Step S74, the authentication image formation controller 326 displays a screen to notify that a print job has been detected (for example, the job detection screen 102 shown in FIG. 14) by controlling the display operation part 122. Furthermore, the movement on the occasion of executing the detected print job is similar to that in Embodiment 1 explained by using FIG. 14.

For example, the identification information TD04, the creator TD05 and the creation time TD06 extracted from the print data PD stored in the memory 323 are as in the list shown in FIG. 16. In such situation, when the reader part 120 reads "IC card identification information" of "xxxxxxxxxx", "login name" of "Jiro Sato" is acquired from the correspondence table CT shown in FIG. 24. Consequently, as shown in FIG. 16, the print data PD with ID=1 and 4 having "Jiro Sato" as identification information TD04 becomes subject for printing.

Figure 30:
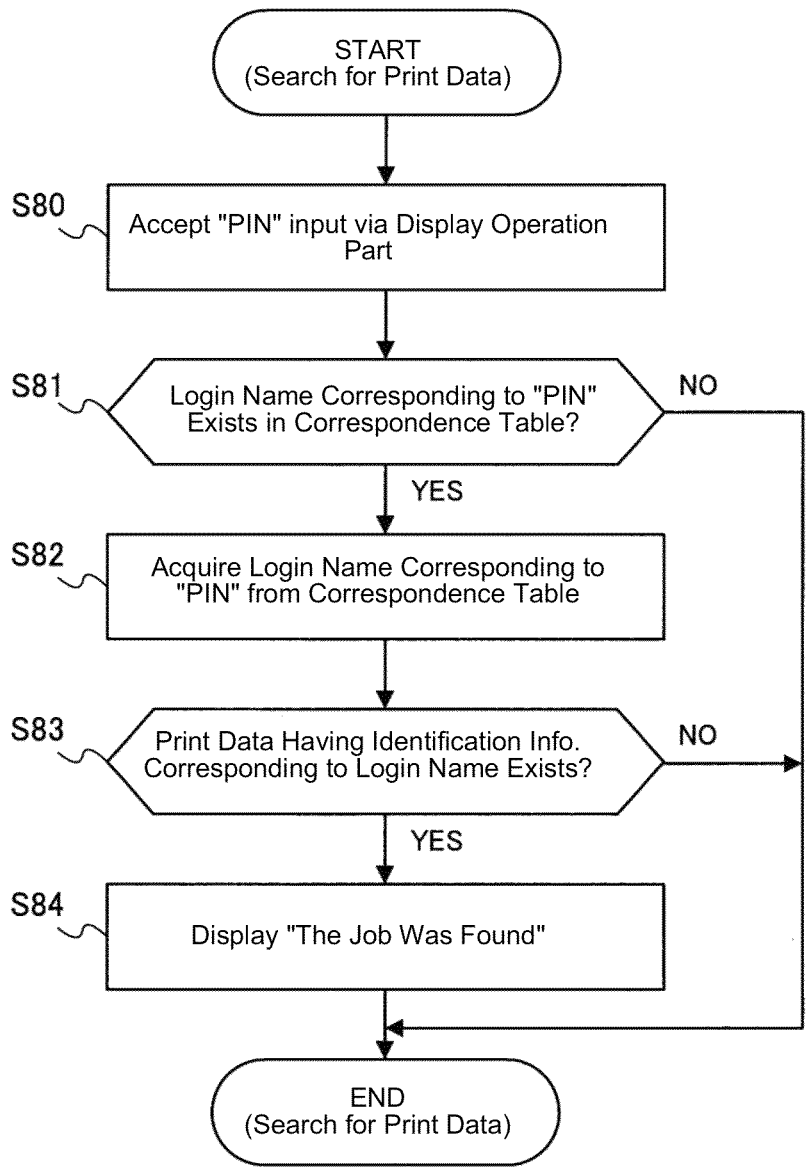
FIG. 30 is a flowchart showing a print data search process upon alternate authentication printing in Embodiment 3.

(Print data searching for alternative authentication print) FIG. 30 is a flowchart showing a print data searching process upon alternative authentication printing of the authentication image formation controller 326. The flowchart shown in FIG. 30 starts, for example, when the display operation part 122 receives an entry of an instruction to start alternative authentication print.

The authentication image formation controller 326 accepts an entry of PIN via the display operation part 122 (or operation panel) (S80).

The authentication image formation controller 326 determines whether "login name" that corresponds to the entered PIN exists in the correspondence table CT (S81). When such a "login name" is stored (S81: Yes), the process moves to Step S82. When such a "login name" is not stored (S81: No), the flow ends.

At Step S82, the authentication image formation controller 326 acquires the "login name" corresponding to the entered PIN from the correspondence table CT. Then, the authentication image formation controller 326 checks the identification information TD04 of the print data PD stored in the memory 323, and determines whether the print data PD having the identification information TD04 corresponding (for example, matched with) the acquired "login name" exists (S83). When such print data PD exists (S83: Yes), the process moves to Step S84, and when such print data PD does not exist (S83: No), the flow ends.

At Step S84, the authentication image formation controller 326 displays the screen notifying that the print job has been detected by control of the display controller 122.

Figure 31:
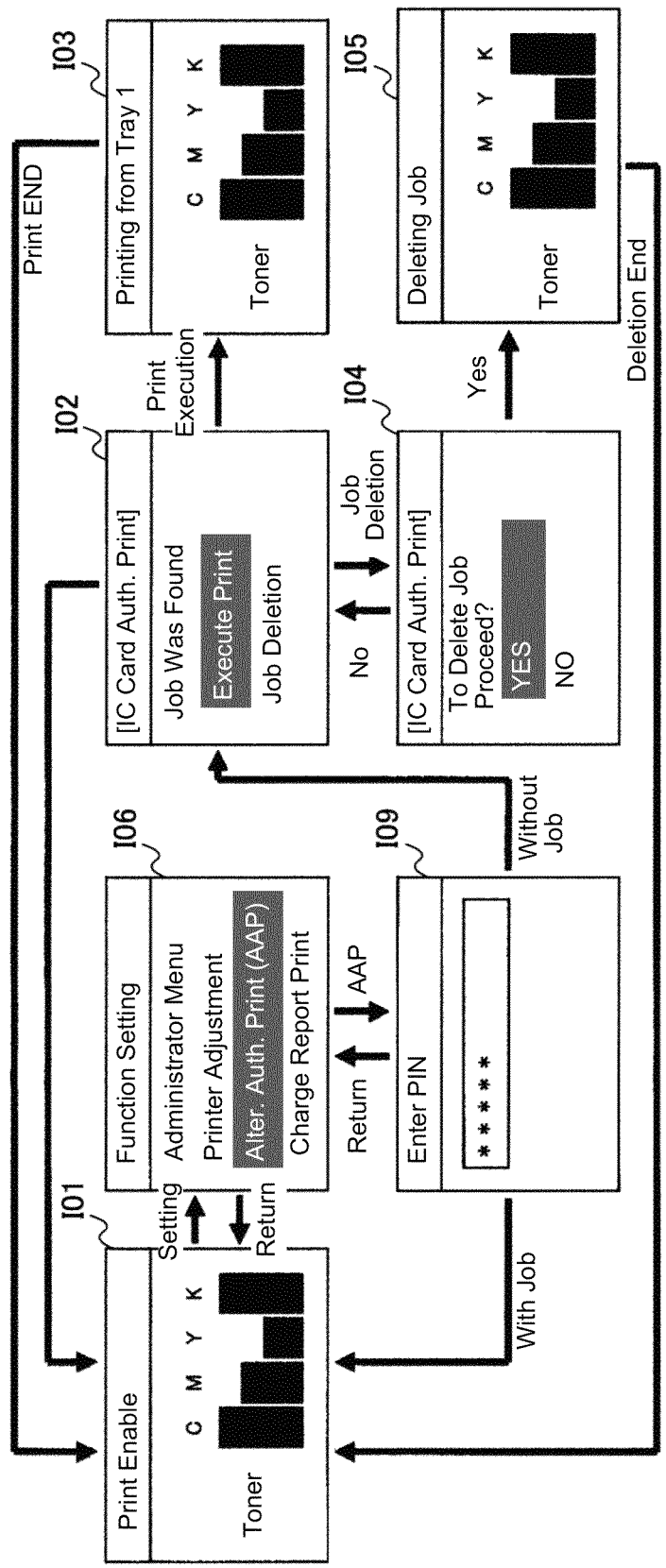
FIG. 31 is a schematic view showing screen transition upon alternate authentication printing in Embodiment 3.

(Execution of alternative authentication print) When the SET key 113d of the operating panel 113 (see FIG. 3) is pressed in a situation where the standby screen I01 shown in FIG. 31 is displayed on the display operation part 122, the screen displayed on the display operation part 122 is transitioned to the functional setting screen 106 shown in FIG. 31. In the functional setting screen 106 shown in FIG. 31, a user can select "Administrator menu", "Printer control", "Alternative authentication print" and "charge report print" by pressing the UP and DOWN keys 113b and 113c. Then, on the functional setting screen 106 shown in FIG. 31, when the SET key 113d is pressed under the situation where the "Alternative authentication print" has a focus, the screen displayed on the display operation part 122 is transitioned to a PIN input screen 109 shown in FIG. 31. On the PIN input screen 109 shown in FIG. 31, if the SET key 113d is pressed in the situation where the PIN is entered, the screen displayed on the display operation part 122 is transitioned to the job detection screen 102 shown in FIG. 31. A user can select "Execute Print" and "Delete Job" by pressing the UP or DOWN keys 113b and 113c of the operating panel 113 under the situation where the job detection screen 102 shown in FIG. 31 is displayed on the display operation part 122. Then, if the SET key 113d is pressed under the situation where "Execute Print" has a focus on the job detection screen 102 shown in FIG. 31, the authentication image formation controller 326 sends the print data PD detected at Step S83 in FIG. 30 to the image forming part 121, and executes printing. In such a case, the authentication image formation controller 326 makes the screen displayed on the display operation part 122 transition from the job detection screen 102 shown in FIG. 31 to the printing screen 103. In the meantime, if the SET key 113d is pressed under the situation where "Delete Job" has a focus on the job detection screen 102 shown in FIG. 31, the authentication image formation controller 126 makes the screen displayed on the display operation part 122 transition from the job detection screen 102 shown in FIG. 31 to the deletion confirmation screen 104 shown in FIG. 31. A user can select "Yes" (agree to deletion) or "No" (not agree to deletion) by pressing the UP or DOWN keys 113b and 113c of the operating panel 113 under the situation where the deletion confirmation screen 104 shown in FIG. 31 is displayed on the display operation part 122. Then, if the SET key 113d is pressed under the situation where "Yes" has a focus on the deletion confirmation screen 104 shown in FIG. 31, the authentication image formation controller 326 deletes the print data PD detected at Step S83 of FIG. 30. In such a case, the authentication image formation controller 326 makes the screen displayed on the display operation part 122 transition from the deletion confirmation screen 104 shown in FIG. 31 to the deleting screen 105. Furthermore, when "No" is determined at Step S81 or S83 in FIG. 30 and the flow ends, the standby screen I01 shown in FIG. 31 is maintained.

For example, the identification information TD04, the creator TD05 and the creation time TD06 extracted from the print data PD stored in the memory 323 are as in the list shown in FIG. 16. Under such situation, if "PIN", which is "123456", as is entered into the display operation part 122, "login name", which is "Jiro Sato", is acquired from the correspondence table CT shown in FIG. 24. Consequently, as shown in FIG. 16, the print data PD with ID=1 and 4 having "Jiro Sato" as the identification information TD04 becomes subject for printing.

According to the image forming system 300 relating to Embodiment 3 as mentioned above, it becomes possible to delegate the print output to another user by making the delegation designation of the print output designatable in the printer driver 133. At this time, since a user can perform authentication using the PIN, the convenience is further enhanced.

Embodiment 4 Hereafter, Embodiment 4 is explained.

(Explanation of Configuration) As shown in FIG. 1, an image forming system 400 relating to Embodiment 4 is equipped with an image forming device 410, the user PC 130, the administrator PC 350 and the authentication server 170. The image forming system 400 relating to Embodiment 4 is different from the image forming device 300 relating to Embodiment 3 in the image forming device 410. Furthermore, hardware configuration of the image forming device 410 in Embodiment 4 is similar to that of the image forming device 110 shown in FIG. 2.

Figure 32:
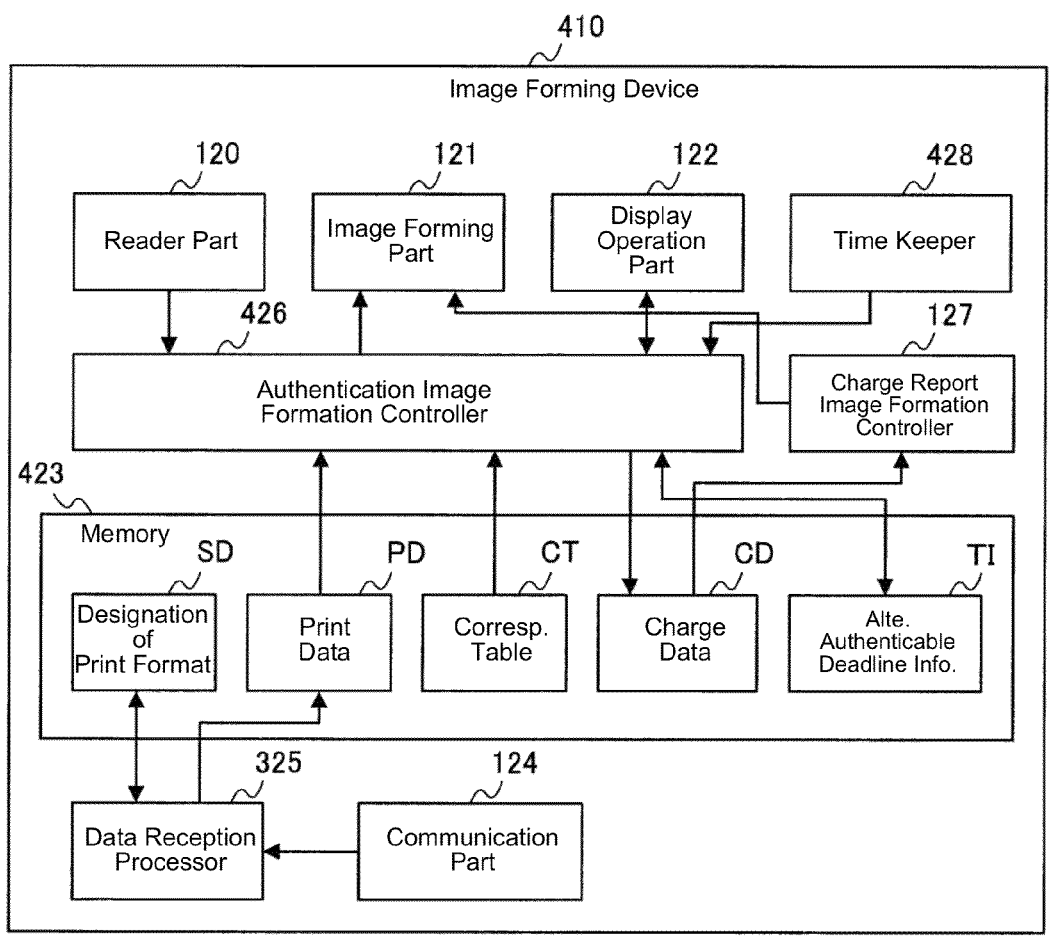
FIG. 32 is a block diagram schematically showing the functional configuration of the image forming device in Embodiment 4.

FIG. 32 is a block diagram schematically showing the functional configuration of the image forming device 410. The image forming device 410 in Embodiment 4 is equipped with the reader part 120, the image forming part 121, the image operation part 122, a memory 423, the communication part 124, the data reception processor 325 and an authentication image formation controller 426. The image forming device 410 in Embodiment 4 is different from the image forming device 310 in Embodiment 3 in a point of data that is stored in the memory 423, a point of process in the authentication image formation controller 426, and a point where a time keeper 428 is further established.

The memory 423, as similar to Embodiment 3, stores the information SD indicating a designation of a print format, the print data PD, the charge data CD and the correspondence table CT; in addition, stores alternative authenticable deadline information TI unlike Embodiment 3. Furthermore, it is preferable that the alternative authenticable deadline information TI is permanently stored within the HDD 115.

Figure 33:
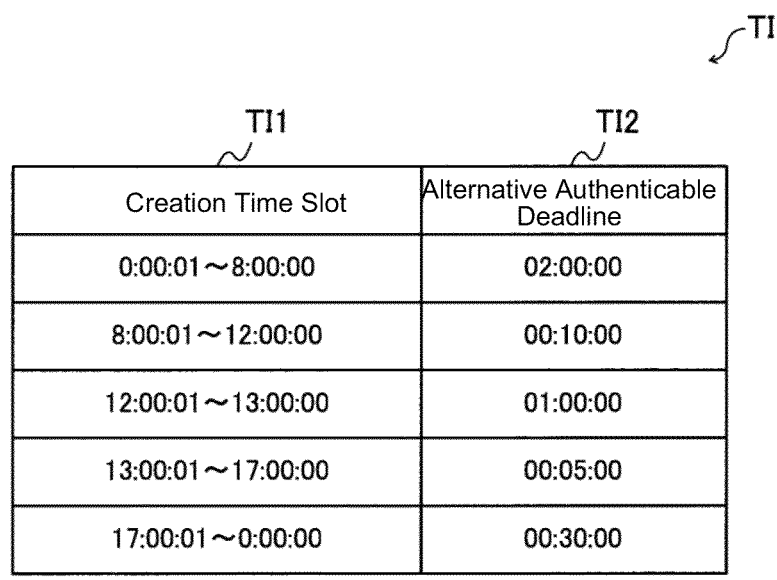
FIG. 33 is a schematic view showing one example of alternate authenticable deadline information.

The alternative authenticable deadline information TI is data that defines an implementable deadline of the alternative authentication print (alternative authentication image formation) for authentication using PIN. FIG. 33 is a schematic view showing one example of the alternative authenticable deadline information TI. The alternative authenticable deadline information TI has a creation time slot section TI1 and an alternative authenticable deadline section TI2. The creation time slot section TI1 stores a creation time slot of the print data PD. The alternative authenticable deadline section TI2 indicates a deadline enabling to perform alternative authentication for authenticating the print data PD using PIN within the creation time slot section TI 1. The starting time of this deadline is, for example, the creation time TD06 of the print data PD. As shown in FIG. 33, the alternative authenticable deadline information TI is deadline information indicating a predetermined deadline per predetermined time slot.

Returning to FIG. 32, the authentication image formation controller 426 specifies a login name corresponding to the IC card identification information read by the reader part 120 from the correspondence table CT, and controls printing and deleting the print data PD having the "identification information" corresponding to (for example, matched with) the specified login name. Further, the authentication image formation controller 326 specifies the login name corresponding to a PIN entered via the display operation part 122 from the correspondence table CT, and that specifies the print data PD having "identification information" corresponding to (for example, matched with) the specified login name. Then, when a time period from the creation time TD06 of the specified print data PD to the present is within the alternative authenticable deadline corresponding to the creation time TD06 of the specified print data PD, the authentication image formation controller 326 prints or deletes the specified print data PD. As explained above, the time period is calculated as a gap between a creation time slot shown in left column and an alternative Authenticable deadline shown in right column in FIG. 33. The time period is an example of the "time (that is) elapsed" recited in claim 5.

The time keeper 428 counts a time. The counted time by the time keeper is regarded as a present time. Furthermore, the time keeper 428 can be realized by the RTC 114 shown in FIG. 2.

(Explanation of movement) Movement of the image forming system 400 relating to Embodiment 4 is substantially similar to that of the image forming system 300 in Embodiment 3, but since the process to search for the print data PD of the alternative authentication print is different, hereafter, this processing is explained.

(Search for print data of alternative authentication print) FIG. 34 is a flowchart showing searching for print data upon alternative authentication printing of the authentication image formation controller 426. The flowchart shown in FIG. 34, for example, starts when the display operation part 122 receives an entry of instruction to start the alternative authentication print.

The authentication image formation controller 426 accepts an entry of PIN via the display operation part 122 (S90).

The authentication image formation controller 326 determines whether "login name" corresponding to the entered PIN exists in the correspondence table CT (S91). When such a "login name" is stored (S91: Yes), the process moves to Step S92. When such a "login name" is not stored (S91: No), the flow is ends.

At Step S92, the authentication image formation controller 426 acquires "login name" corresponding to the entered PIN from the correspondence table CT. Then, the authentication image formation controller 426 checks the identification information TD04 of the print data PD stored in the memory 423, and determines whether the print data PD having the identification information TD04 corresponding to (for example, matched with) the acquired "login name" exists (S93). When such print data PD exists (S93: Yes), the process moves to Step S94, and when such print data PD does not exist (S93: No), the flow ends.

At Step S94, the authentication image formation controller 426 determines whether the print data PD detected at Step S93 is within the alternative authenticable deadline. For example, the authentication image formation controller 426 specifies an alternative authenticable deadline corresponding to a creation time slot including the creation time TD06 of the detected print data PD that is detected with reference to the alternative authenticable deadline information TI. The authentication image formation controller 426 acquires a present time from the time keeper 428. Then, the authentication image formation controller 426 determines whether a time elapsed from the creation time TD06 of the detected print data PD to the present time is within the specified alternative authenticable deadline. When the print data PD is within the alternative authenticable deadline (S94: Yes), the process moves to Step S95, and when the detected print data PD is not within the alternative authenticable deadline (S94: No), the flow ends.

At Step S95, the authentication image formation controller 426 displays a screen to provide notification that the print job has been detected by controlling the display controller 122. Furthermore, the movement on the occasion of executing the detected print job is similar to that in Embodiment 3 explained using FIG. 31.

For example, the identification information TD04, the creator TD05 and the creation time TD06 extracted from the print data PD stored in the memory 423 are assumed to be as in the list shown in FIG. 16. Under such situation, when "PIN", which is "123456", is entered into the display operation part 122, "login name", which is "Jiro Sato", is acquired from the correspondence table CT shown in FIG. 24. Consequently, as shown in FIG. 16, the print data PD with ID=1 and 4 having "Jiro Sato" as the identification information TD04 becomes subject for printing. According to FIG. 16, the creation time TD06 of the print data PD with ID=1 is "9:12:00", i.e., nine hours, twelve minutes, and the creation time TD06 of the print data PD with ID=4 is "12:15:30", i.e., twelve hours, fifteen minutes and thirty seconds. According to the alternative authenticable deadline information TI shown in FIG. 33, since the creation time (9:12:00) of the print data PD with ID=1 is included in "Creation time slot" of "8:00:01 to 12:00:00", the "Alternative authenticable deadline" is "00:10:00" from the creation time TD06, i.e., for 10 minutes. Therefore, the print data PD with ID=1 is alternatively authenticable until "9:22:00". Similarly, since the creation time TD06 of the print data PD with ID=4 is "12:15:30", according to the alternative authenticable information TI shown in FIG. 33, it is included in "Creation time slot" of "12:00:01 to 13:00:00". Therefore, "Alternative authenticable deadline" of the print data PD with ID=4 is "01:00"00" from the creation time, i.e., for one hour. In other words, the print data PD with ID=4 is alternatively authenticable until "13:15:30". When the present time acquired from the time keeper 428 is just 13:00, the print data PD with ID=1 is out of the alternative authenticable deadline, and the print data PD with ID=4 is within the alternatively authenticable deadline. Therefore, only the print data with ID=4 is subject for printing.

Furthermore, the alternative authenticable deadline information TI is modifiable, for example, via the display operation part 122. Further, the alternative authenticable deadline information TI may be created by the administrator PC 350 and may be stored in the image forming device 410.

The alternative authentication print is a convenient function as an emergency means when a user forgets an IC card, but it is a function having low security if considering leakage of PIN. Thus, according to Embodiment 4, an effect to reduce a wrong print output by a user who is not a delegation destination, by setting a deadline for alternative authentication print by a PIN entry from the display delegation part 122.

In Embodiments 1 to 4, encryption of the transmission data TD and the print data PD is not mentioned, but these can be encrypted. For example, the printer driver 133 encrypts the transmission data TD using "identification information" as an encryption key, and the authentication image formation control parts 126, 226, 326 and 426 can decode the print data PD.

In Embodiments 1 to 4, the examples where a noncontact type card, such as an IC card, is used as an authentication medium were explained, but it is also possible to substitute a USB device, such as a USB memory.

In Embodiments 1 to 4, the examples where [the present invention] are applied to a printer having a printing function as the image forming devices 110, 210, 310 and 410 were explained, but the present invention is applicable even in a complex machine having a scanning function and a fax function in addition to a printing function.

What is claimed is:

1. An image forming system in which an information processor and an image forming device are transmissibly connected, wherein the information processor comprises:
a first memory that pre-stores user identification information,
an input part that accepts an entry of delegation destination identification information indicating a delegation destination of an image formation output,
a data creation part that
creates transmission data including the delegation destination identification information as first authentication information if print output delegation is set and if the entry of the delegation destination identification information is accepted by the input part,
creates transmission data including the user identification information stored in the first memory as first authentication information if the print output delegation is set but if the entry of the delegation destination identification information is not accepted by the input part, and
creates transmission data including the user identification information stored in the first memory as first authentication imformation if the print output delegation is not set, and
a transmission part that sends the transmission data created by the data creation part to the image forming device; and
the image forming device comprises:
a reception part that receives the transmission data,
an authentication part that performs authentication using the first authentication information included in the transmission data received by the reception part, and that permits image formation based upon the transmission data received by the reception part if the authentication is successful, an image forming part that forms an image on a recording medium based upon the transmission data permitted by the authentication part, a second memory that stores correspondence information in which second authentication information corresponds to first identification information, and an acquisition part that acquires the first identification information, and the authentication part refers to the correspondence information stored in the second memory, specifies the second authentication information corresponding to the first identification information acquired by the acquisition part, and determines the authentication as successful if the specified second authentication information corresponds to the first authentication information included in the transmission data received by the reception part.

2. The image forming system according to claim 1, wherein the acquisition part acquires the second authentication information, and the authentication part determines the authentication as successful if the first authentication information included in the transmission data received by the reception part corresponds to the second authentication information acquired by the acquisition part.

3. The image forming system according to claim 1, wherein the correspondence information stored in the second memory includes second identification imformation that corresponds to the second authentication information, and the image forming device further comprises:
an operation part that accepts an entry of the second identification information; and the authentication part refers to the correspondence information stored in the second memory, specifies the second authentication information corresponding to the second identification information entered into the operation part, and determines the authentication as successful if the specified second authentication information corresponds to the first authentication information included in the transmission data received by the reception part.

4. The image forming system according to claim 1, wherein the data creation part includes a creation time of the transmission data in the transmission data;

the correspondence information including the second authentication information that corresponds to second identification information, and deadline information indicating a predetermined deadline per predetermined time slot, and the image forming device further comprises:
an operation part that accepts an entry of the second identification information; and the authentication part determines the authentication as successful in the case of fulfilling both conditions follows:

a first condition where, referring to the correspondence information stored in the second memory, the second authentication information corresponding to the second identification information entered into the operation part is specified, and the specified second authentication information is determined corresponding to the first authentication information included in the transmission data received by the reception part, and a second condition where, referring to the deadline information stored in the second memory, a time elapsed from a creation time included in the transmission data received by the reception part is within a deadline corresponding to a time slot including the creation time included in the transmission data received by the reception part.

5. The image forming system according to claim 2, wherein the acquisition part is a reader part that reads information from an authentication medium.

6. The image forming system according to claim 5, wherein the authentication medium is a noncontact type card.

7. The image forming system according to claim 5, wherein the authentication medium is a USB device.

8. The image forming system according to claim 1, wherein the authentication part creates charge data for charging a user who has received authentication based upon the first authentication information.

9. The image forming system according to claim 1, wherein the data creation part includes the user identification information stored in the first memory of the image processing device in the transmission data; and the authentication part creates charge data for charging a user corresponding to the user identification information.

10. An information processor, comprising:
a memory that pre-stores user identification information,
an input part that accepts an entry of delegation destination identification information indicating a delegation destination of an image formation output,
a data creation part that
creates transmission data including the delegation destination identification information as first authentication information if print output delegation is set and if the input part accept the entry of the delegation destination identification information,
creates transmission data including the user identification information stores in the memory as first authentication if the print output delegation is set but the input part does not accept the entry of the delegation destination identification information, and
creates transmission data including the user identification information stored in the memory as first authentication information if lthe print output delegation is not set, and
a transmission part that sends the transmission data created by the data creation part to an image forming device.

11. An image forming system in which an information processor and an image forming device are transmissibly connected, wherein
the information processor comprises:
a first memory that pre-stores user identification information,
an input part that accepts an entry of delegation identification information indicating a delegation destination of an image formation output,
a data creation part that creates transmission data including the delegation destination identification information as first authentication information if the entry of the delegation destination identification information is accepted by the input part, and that creates transmission data including the user identification information stored in the first memory as first authentication information if the entry of the delegation destination identification information is not accepted by the input part, and a transmission part that sends the transmission data created by the data creation part to the image forming device;

the image forming device comprises:
a reception part that receives the transmission data,
an authentication part that performs authentication using the first authentication information included in the transmission data received by the reception part, and that permits image formation based upon the transmission data received by the reception part if the authentication is successful, and
an image forming part that forms an image on a recording medium based upon the transmission data permitted by the authentication part, the data creation part includes a creation time of the transmission data in the transmission data, the image forming device further comprises:
a second memory that stores correspondence information, in which second authentication information corresponds to second identification information, and deadline information indicating a predetermined deadline per predetermined time slot, and
an operation part that accepts an entry of the second identification information; and the authentication part determines the authentication as successful in the case of fulfilling both conditions follows:
a first condition where, referring to the correspondence information stored in the second memory, the second authentication information corresponding to the second identification information entered into the operation part is specified, and the specified second authentication information is determined corresponding to the first authentication information included in the transmission data received by the reception part, and
a second condition where, referring to the deadline information stored in the second memory, a time elapsed from a creation time included in the transmission data received by the reception part is within a deadline corresponding to a time slot including the creation time included in the transmission data received by the reception part.

12. An image forming system in which an information processor and an image forming device are transmissibly connected, wherein
the information processor comprises:
a first memory that pre-stores user identification information,
an input part that accepts an entry of delegation destination identification information indicating a delegation destination of an image formation output,
a data creation part that
creates transmission data including the delegation destination identification information as first authentication information if print output delegation is set and if the entry of the delegation destination identification information is accepted by the input part,
creates transmission data including the user identification information stored in the first memory as first authentication information if the print output delegation is set but if the entry of the delegation destination identification information is not accepted by the input part, and
creates transmission data including the user identification information stored in the first memory as first authentication information if the print output delegation is not set, and
a transmission part that sends the transmission data created by the data creation part to the image forming device; and the image forming device comprises:
a reception part that receives the transmission data,
an authentication part that performs authentication using the first authentication information included in the transmission data received by the reception part, and that permits image formation based upon the transmission data received by the reception part if the authentication is successful,
an image forming part that forms an image on a recording medium based upon the transmission data permitted by the authentication part,
a second memory that stores correspondence information in which first identification information corresponds to second authentication information, and
an operation part that accepts an entry of the first identification information; and the authentication part refers to the correspondence information stored in the memory, specifies the second authentication information corresponding to the first identification information entered into the operation part, and determines the authentication as successful if the specified second authentication information corresponds to the first authentication information included in the transmission data received by the reception part.

13. The image forming system according to claim 12, wherein
the image forming device further comprises an acquisition part that acquires the second authentication information; and
the authentication part determines the authentication as successful if the first authentication information included in the transmission data received by the reception part corresponds to the second authentication information acquired by the acquisition part.

14. The image forming system according to claim 12, wherein
the data creation part includes a creation time of the transmission data in the transmission data;
the authentication part determines the authentication as successful in the case of fulfilling both conditions follows:
a first condition where, referring to the correspondence information stored in the second memory, the second authentication information corresponding to the first identification information entered into the operation part is specified, and the specified second authentication information is determined corresponding to the first authentication information included in the transmission data received by the reception part, and
a second condition where, referring to the deadline information stored in the second memory, a time elapsed from a creation time included in the transmission data received by the reception part is within a deadline corresponding to a time slot including the creation time included in the transmission data received by the reception part.

15. The image forming system according to claim 13, wherein
the acquisition part is a reader part that reads information from an authentication medium.

16. The image forming system according to claim 15, wherein
the authentication medium is a noncontact type card.

17. The image forming system according to claim 15, wherein the authentication medium is a USB device.

18. The image forming system according to claim 12, wherein
the authentication part creates charge data for charging a user who has received authentication based upon the first authentication information.

19. The image forming system according to claim 12, wherein
the data creation part includes the user identification information stored in the first memory of the image processing device in the transmission data; and
the authentication part creates charge data for charging a user corresponding to the user identification information.

\* \* \* \* \*